(12) United States Patent
Parikh et al.

(10) Patent No.: US 8,086,620 B2
(45) Date of Patent: Dec. 27, 2011

(54) INFERENCE OF QUERY RELATIONSHIPS

(75) Inventors: Nishith Parikh, San Jose, CA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 504 days.

(21) Appl. No.: 12/202,176

(22) Filed: Aug. 29, 2008

(65) Prior Publication Data

US 2009/0070323 A1 Mar. 12, 2009

Related U.S. Application Data

(60) Provisional application No. 60/971,888, filed on Sep. 12, 2007, provisional application No. 61/073,692, filed on Jun. 18, 2008.

(51) Int. Cl.
*G06F 17/30* (2006.01)

(52) U.S. Cl. ........................................ 707/765; 707/767

(58) Field of Classification Search .................. 707/706, 707/707, 741, 742, 748, 749, 753, 754, 780, 707/765, 767

See application file for complete search history.

(56) References Cited

U.S. PATENT DOCUMENTS

| | | | |
|---|---|---|---|
| 5,694,592 | A | 12/1997 | Driscoll |
| 6,847,966 | B1 | 1/2005 | Sommer et al. |
| 6,901,402 | B1 | 5/2005 | Corston-Oliver et al. |
| 7,921,107 | B2 | 4/2011 | Chang et al. |
| 2002/0188621 | A1 | 12/2002 | Flank et al. |
| 2005/0177554 | A1* | 8/2005 | Peltonen et al. ............ 707/3 |
| 2005/0289100 | A1 | 12/2005 | Dettinger et al. |
| 2006/0122965 | A1* | 6/2006 | Adams et al. ............ 707/2 |
| 2007/0100804 | A1 | 5/2007 | Cava |
| 2007/0266002 | A1* | 11/2007 | Chowdhury et al. ......... 707/2 |
| 2009/0070299 | A1 | 3/2009 | Parikh et al. |

FOREIGN PATENT DOCUMENTS

| WO | WO-2009035653 A1 | 3/2009 |
|---|---|---|
| WO | WO-2009035656 A1 | 3/2009 |

OTHER PUBLICATIONS

"International Application Serial No. PCT/US2008/010644, Search Report mailed Dec. 2, 2008", 4 pgs.
"International Application Serial No. PCT/US2008/010644, Written Opinion mailed Dec. 2, 2008", 4 pgs.
"International Application Serial No. PCT/US2008/010649, Search Report mailed Nov. 25, 2008", 4 pgs.
"International Application Serial No. PCT/US2008/010649, Written Opinion mailed Nov. 25, 2008", 6 pgs.
"U.S. Appl. No. 12/202,185, Non Final Office Action mailed Apr. 28, 2011", 19 pgs.
"U.S. Appl. No. 12/202,185, Response filed Jul. 18, 2011 to Non-Final Office Action mailed Apr. 28, 2011", 12 pgs.
"International Application Serial No. PCT/US2008/010644, International Preliminary Report on Patentability mailed Mar. 25, 2010", 7 pgs.
"International Application Serial No. PCT/US2008/010649, International Preliminary Report on Patentability mailed Mar. 25, 2010", 10 pgs.

* cited by examiner

*Primary Examiner* — Charles Rones
*Assistant Examiner* — Fariborz Khoshnoodi
(74) *Attorney, Agent, or Firm* — Schwegman, Lundberg & Woessner, P.A.

(57) ABSTRACT

Various example embodiments are provided for inferring relationships between queries. In an example, queries are related based on the identification of common terms between the queries. Another example is to relate queries based on the identification that the queries are associated with a single search session.

22 Claims, 22 Drawing Sheets

INFERENCE OF QUERY RELATIONSHIPS

CROSS-REFERENCES TO RELATED APPLICATIONS

This application claims the benefit of U.S. Provisional Application No. 60/971,888, filed Sep. 12, 2007, and also claims the benefit of U.S. Provisional Application No. 61/073,692, filed Jun. 18, 2008, the disclosures of which are incorporated herein by reference.

FIELD

The present disclosure relates generally to information retrieval, and more particularly, in an example embodiment, relates to the inference of query relationships.

BACKGROUND

Online shopping and auction websites provide a number of publishing, listing, and price-setting mechanisms whereby a seller may list (or publish information concerning) items for sale. A buyer can express interest in or indicate a desire to purchase such items by, for example, submitting a query to the website for use in a search of the requested items.

The accurate matching of a query to relevant items is currently a major challenge in the field of information retrieval. An example of such a challenge is that item descriptions (e.g., title) tend to be short and such descriptions may be uniquely defined by the sellers. The buyers seeking to purchase the items might use a different vocabulary from the vocabulary used by the sellers to describe the items. As an example, an item identified in the title as a "garnet" does not match a query "January birthstone" submitted by a buyer, although garnet is known as the birthstone for January. In another example, an item identified in the title as "Martin guitar" does not match the query "acoustic guitar" submitted by a buyer, although the Martin guitar is a specialization of an acoustic guitar. As a result, online shopping and auction websites that use a conventional search engine to locate items may not effectively connect the buyers to the sellers.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide various techniques for inferring relationships between queries. As will be explained in more detail below, one example technique is to relate queries based on the identification of common terms between the queries. Another example technique is to relate queries based on the identification that the queries are associated with a single search session. Yet another example technique is to infer relationships based on the identification of relationships between item attributes retrieved from the submission of the queries.

Figure 1:
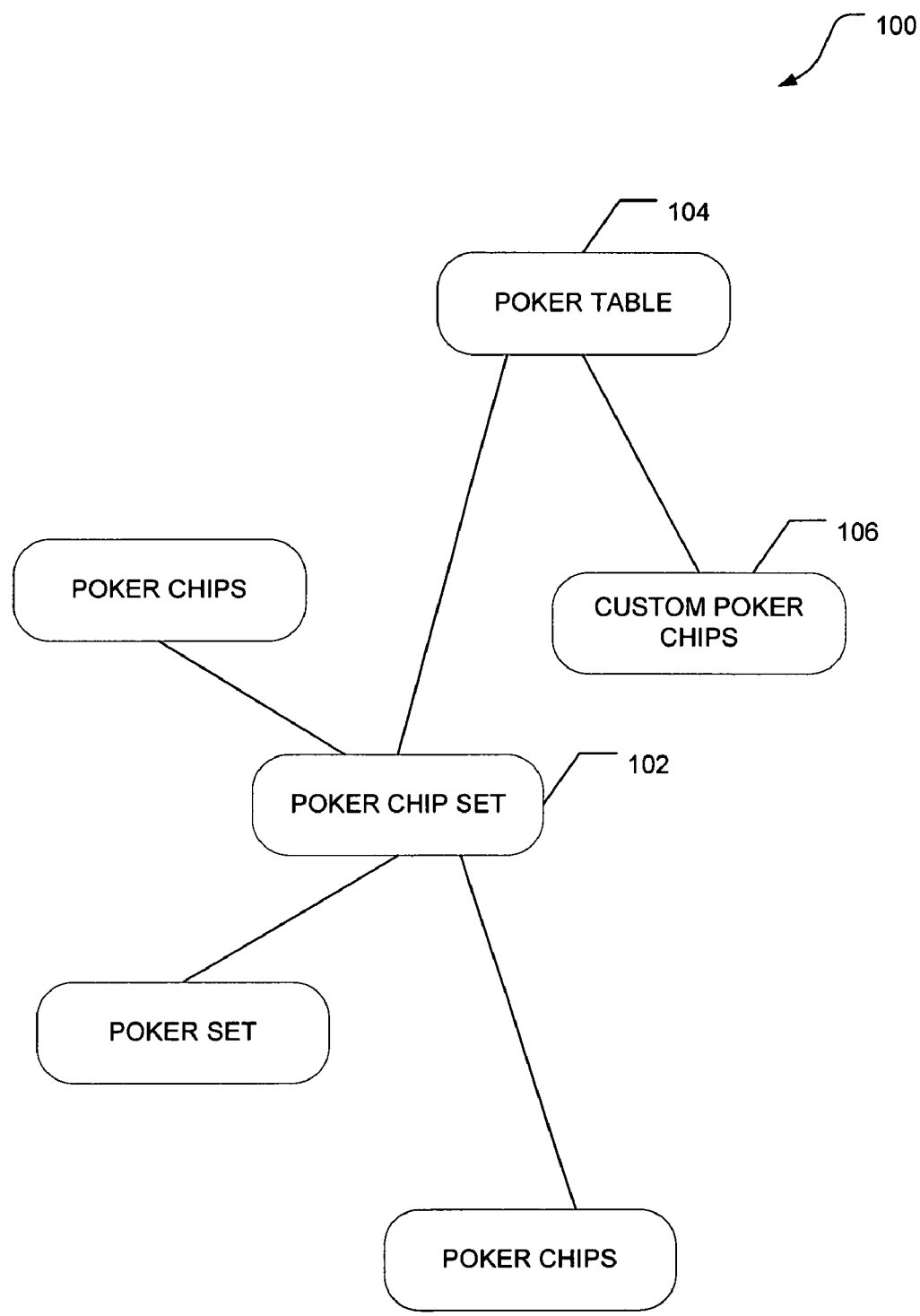
FIG. 1 depicts a graphical representation, in accordance with in an example embodiment, of related queries.

FIG. 1 depicts a graphical representation, in accordance with in an example embodiment, of related queries. As used herein, a "query" is an enquiry about one or more items, which include any tangible or intangible thing and/or something that has a distinct, separate existence from other things (e.g., goods, services, electronic files, and land). The terms included in the query may include words, numbers, symbols, and other alphanumeric characters. A user may input or submit a query to an online shopping or auction website to locate, purchase or bid on one or more items. As depicted in FIG. 1, the queries may be depicted in a query network graph 100 where each node of the graph 100, such as nodes 102, 104, and 106, represents a unique query and defined within the nodes are the terms that comprise the query. The connecting lines between the queries represent relationships. For example, the query network graph 100 shows that the query "poker chip set" 102 is related to the query "poker table" 104 by the connection of the query 102 to the query 104. The same query "poker chip set" 102 is not directly related to the query "custom poker chips" 106 because the query 102 is not directly connected to the query 106. However, the query "poker table" 104 is directly related to the query 106 because they are connected.

As explained in more detail below, relationships between queries may be inferred based on a variety of different techniques and the query network graph 100 may be built or generated base on results from the application of the relationship inference techniques. With the query network graph 100, various relationships between the queries may be derived. For example, a user may use the query network graph 100 to find semantic similarities between his queries and other queries submitted by other users such as to provide the user with suggestions of other terms that may be used to expand the search. In an example, a user may input the query "poker chip set" 102 and, as a result, the query network graph 100 is generated to show the user other related queries submitted by other users. The use of the query network graph 100 may be particularly useful for users who have a vague idea of the items they want, but may not know the correct terms to submit in a query. In an example, a user can locate a particular camera with only a vague idea of the model number and may then be able to discover this particular camera through the use of the query network graph 100, which may expand his search.

Figure 2:
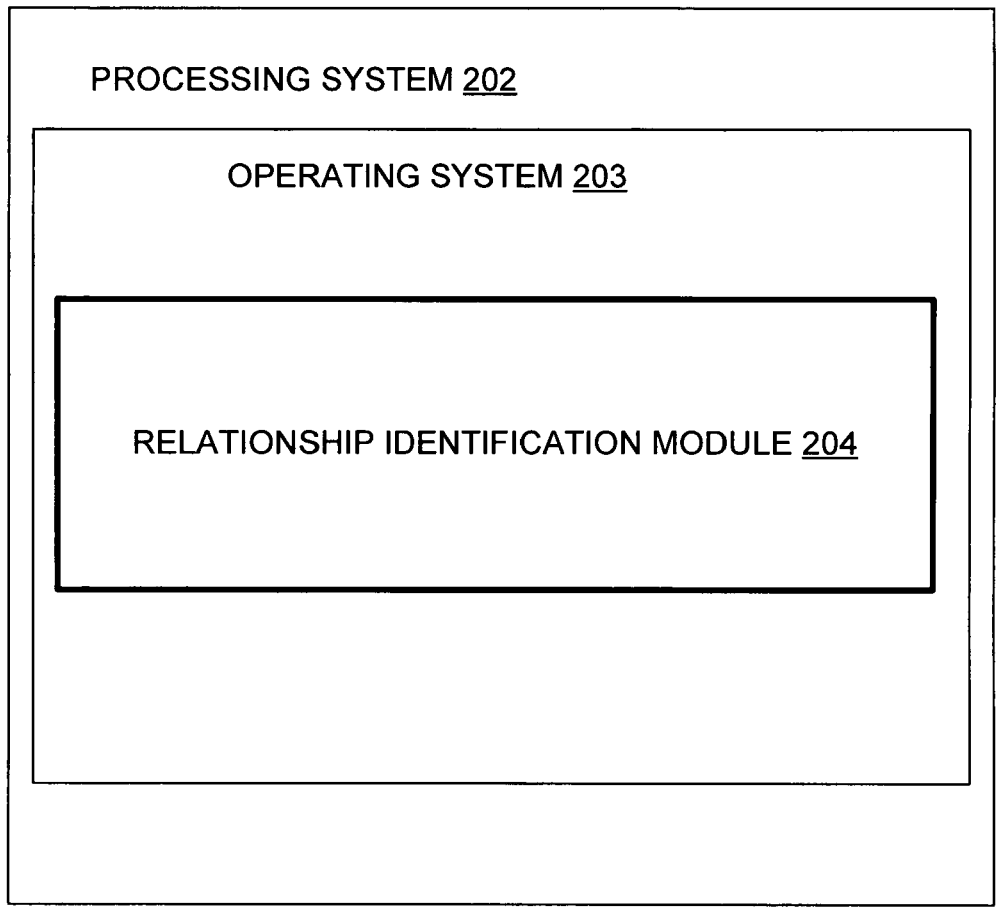
FIG. 2 depicts a block diagram of a processing system, in accordance with an example embodiment, that hosts a relationship identification module that is configured to infer relationships between queries.

FIG. 2 depicts a block diagram of a processing system 202, in accordance with an example embodiment, that hosts a relationship identification module 204 that is configured to infer relationships between queries. It should be appreciated that the processing system 202 may be employed in the form of a variety of computing devices, such as personal computers, laptop computers, server computers, a tablet personal computer, a set-up box, and a web appliance. In various example embodiments, the processing system 202 may be used to implement computer programs, logic, applications, methods, processes, or other software to infer the relationships between queries, as described in more detail below.

The processing system 202 executes an operating system 203 that manages the software processes and/or services executing on the processing system 202. As depicted in FIG. 2, these software processes and/or services may include the relationship identification module 204. In general, the relationship identification module 204 is configured to find and infer relationships between queries. In an example embodiment, the relationship identification module 204 may infer relationships based on textual similarity. As explained in more detail below, a query may be textually similar to another query if at least one common term exists between the two queries. In another example embodiment, the relationship identification module 204 may infer relationships based on similarities within and between user search sessions. Here, as will be explained in more detail below, relationships are established between queries that are included in single search sessions. In yet another example embodiment, which is also explained in more detail below, the relationship identification module 204 may infer relationships between queries based on attributes shared between the queries.

Relationships Based on Textual Similarity Match

Figure 3:
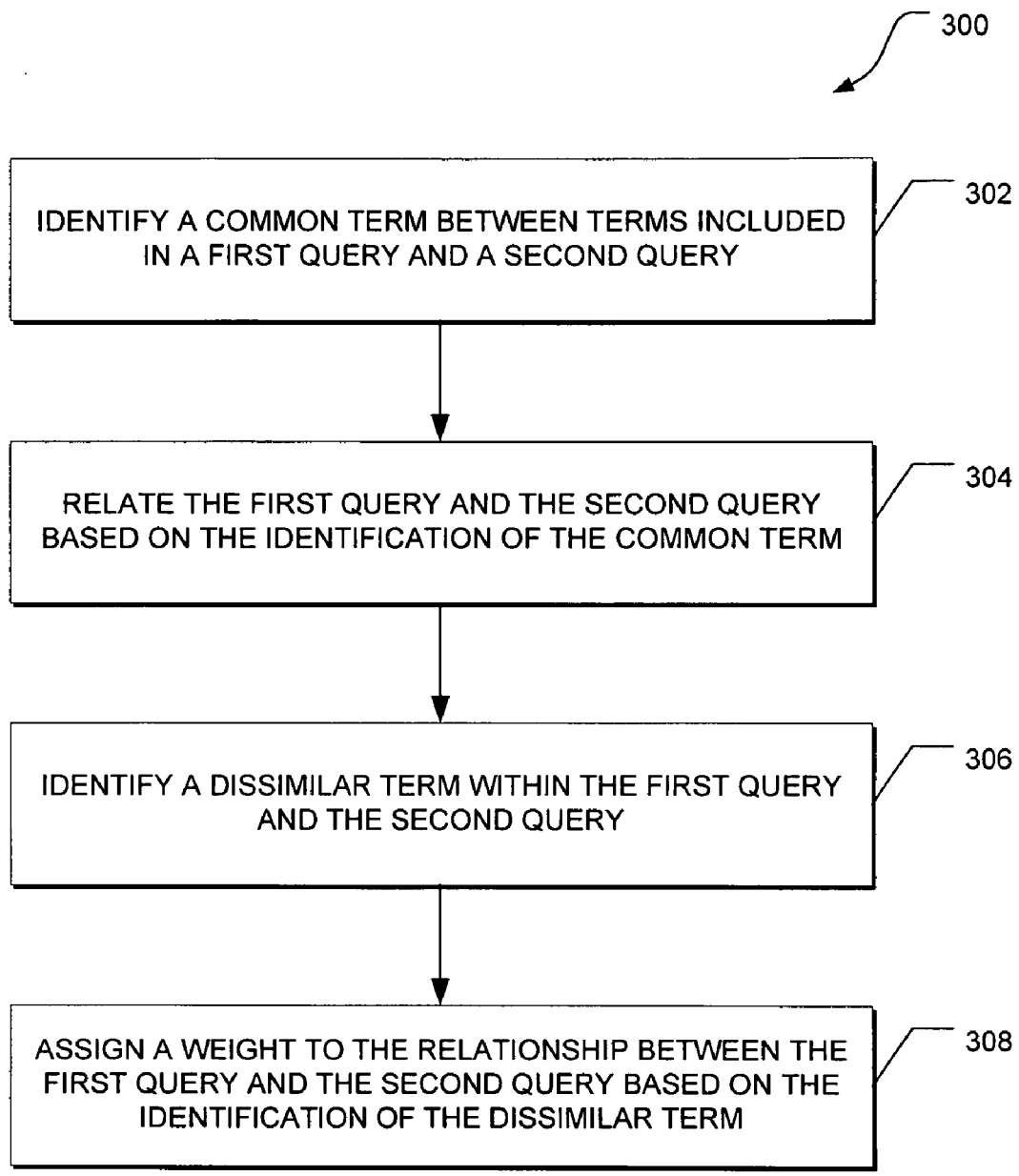
FIG. 3 depicts a flow diagram of a general overview of a method, in accordance with an example embodiment, for inferring a relationship between two queries based on textual similarity.

FIG. 3 depicts a flow diagram of a general overview of a method 300, in accordance with an example embodiment, for inferring a relationship between two queries based on textual similarity. In an example embodiment, method 300 may be implemented by the relationship identification module 204 of FIG. 2 and employed in the processing system 202. In the example of FIG. 3, two queries are provided, namely a first query and a second query, which may be inputted or submitted by the same user or by different users. Both queries are comprised of one or more terms and, as depicted at 302, one or more common terms are identified between the terms included in the first query and the terms included in the second query. As used herein, a "common term" is a term included in a query that is similar to another term defined in at least one other query. In an example embodiment, the identification of the common term is based on a textual similarity match. A textual similarity match is based on matching characters (e.g., alphanumeric characters) of a portion or a complete term. As an example, the queries "automobile" and "red automobile" share a common term "automobile." The terms do not have to be identical for a textual similarity match. For example, different forms of a term (e.g., plural, singular, and gerund) may be identified as equivalent to the term. As an example, the queries "red apple" and "green apples" share a common term "apple" if the common term is defined as to include plural forms of nouns.

To identify a common term, the terms included in the first query may be compared to the terms included in the second query. As explained in more detail below, the results of the comparison may be grouped or summarized in an inverted index. If a common term cannot be identified, then the first query has no relationship to the second query. However, if at least one common term is identified, then the first query is related to the second query at 304. For example, a query (e.g., first query or second query) may be represented as:

$$Q = W_q = \{W_1 W_2 \ldots W_n\}$$

where $W_i$, i=1, 2, 3 . . . n are the unique terms in the query Q and n is the total number of the unique terms. For every query Q, queries $Q_c$ are located such that $W_q$ is a subset of $W_{q_c}$ (or $W_q \subseteq W_{q_c}$). It should be appreciated that the queries can be formed by adding new terms to query Q, and that the query Q may then be related to each query $Q_c$.

After the first query is related to the second query, dissimilar terms are identified between the terms included in the first query and the terms included in the second query at 306. As used herein, a "dissimilar term" is a term included in a query that is not defined in a selected group of queries. As a result, a dissimilar term is unique amongst a group of queries. To identify the dissimilar terms, the terms included in the first query may be compared with the terms included in the second query. In an example embodiment, the identification of the dissimilar term is also based on a textual similarity match. As an example, the queries "automobile" and "red automobile" share a dissimilar term "red." In another example, the queries "green apple" and "green apples" do not have any dissimilar terms if the dissimilar term is defined as to exclude plural forms of nouns.

With the dissimilar terms identified, a weight to the relationship between the first query and the second query may be assigned at 308 based on the identification of the dissimilar term. A "weight," as used herein is the relative probability of one or more relationships between queries or, as explained in more detail below, between attributes. That is, the weight may be defined as the strength of relationship between queries. As explained in more detail below, the weight may be assigned to a relationship between the first query and the second query based on a number of or count of the dissimilar terms between the first query and the second query.

Figure 4A:
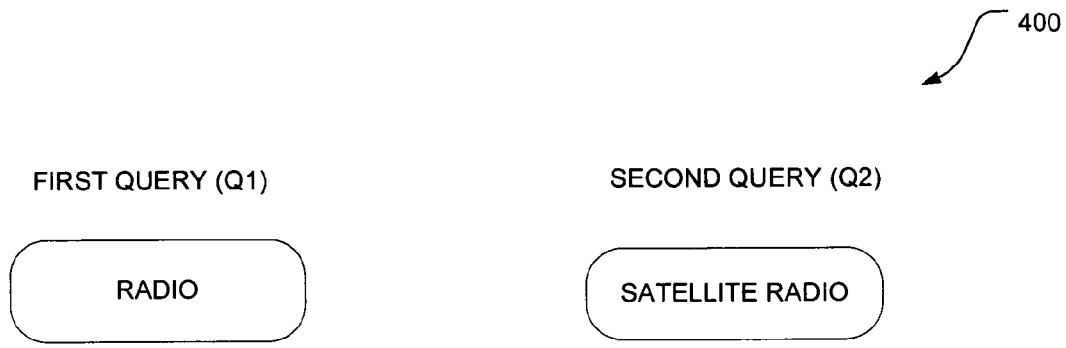
FIGS. 4A and 4B depict a graphical representation a relationship, in accordance with an example embodiment, between a first query and a second query.
Figure 4B:
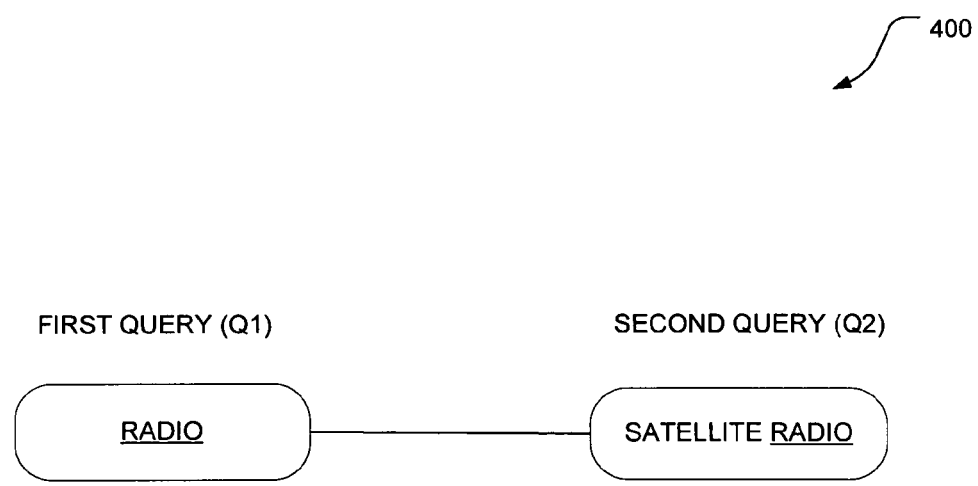

FIGS. 4A and 4B depict a graphical representation a relationship, in accordance with an example embodiment, between a first query Q1 and a second query Q2. As depicted in FIG. 4A, the query network graph 400 shows two nodes, with each node representing a query. The first query Q1 includes the term "radio" while at the second query Q2 includes the terms "satellite radio." The terms of the first query Q1 are compared with the terms included in the second query Q2 and, as a result of the comparison, a common term "radio" is identified between the terms included in the first query Q1 the second query Q2. As depicted in FIG. 4B, the first query Q1 is therefore related to the second query Q2. The related queries Q1 and Q2 may then be connected in the query network graph 400 by an edge, which indicates a relationship connecting the two queries Q1 and Q2.

Figure 5:
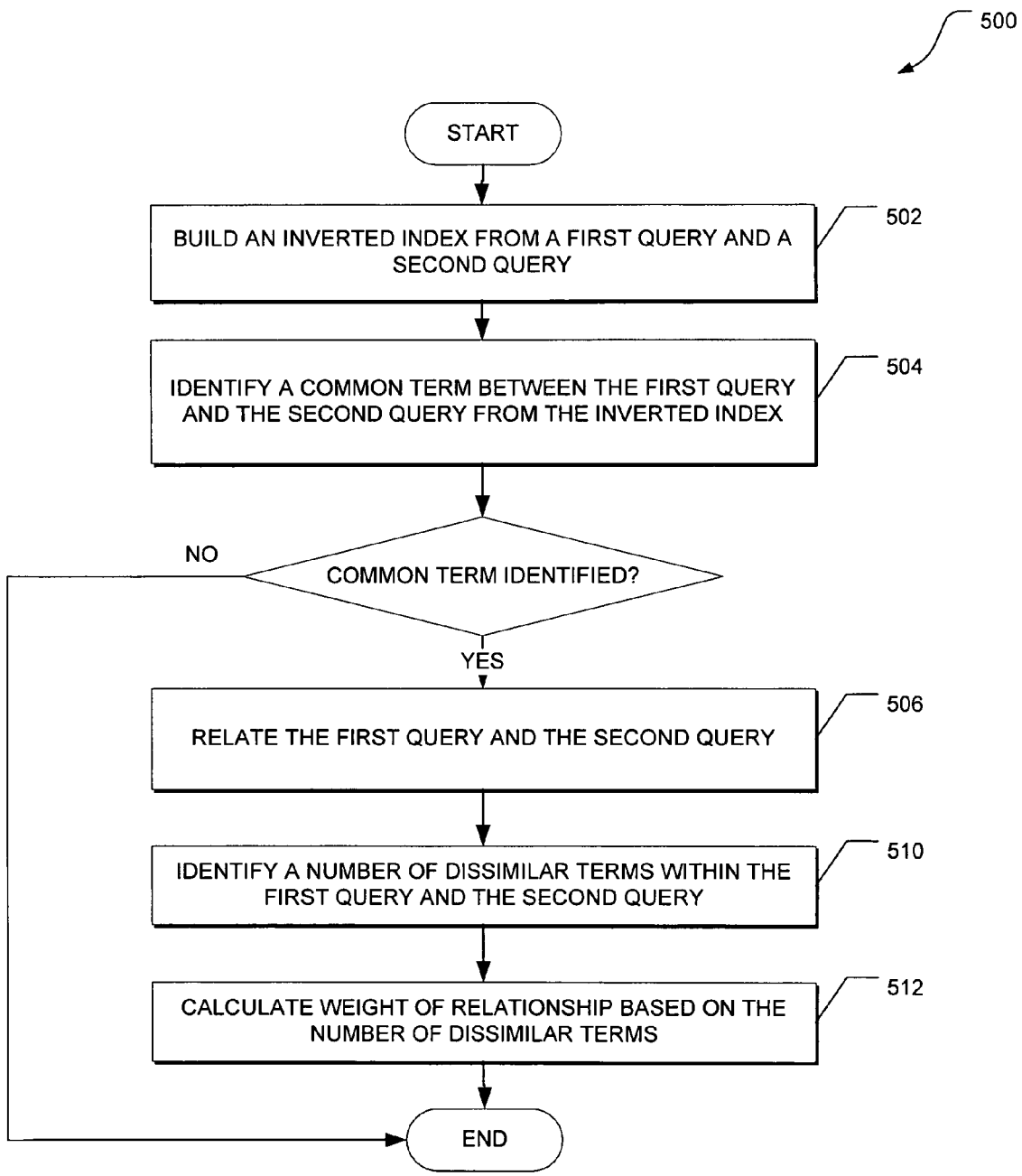
FIG. 5 depicts a flow diagram of a detailed method, in accordance with an example embodiment, for inferring a relationship between two queries.

FIG. 5 depicts a flow diagram of a detailed method 500, in accordance with an example embodiment, for inferring a relationship between two queries. In the example of FIG. 5, two queries are provided, namely a first query and a second query. Initially, at 502, an inverted index is built from the first query and the second query. As an example, the inverted index may be built from a comparison of the terms included in the first query and the second query. An inverted index is an index data structure storing a mapping from terms to their locations in one or more queries. For example, given that the first query $Q_0$ is comprised of terms "red phone" and the second query $Q_1$ is comprised of terms "blue phone," then an example inverted index depicted in the following Table A may be constructed.

TABLE A

"red": {0}
"phone": {0, 1}
"blue": {1} where the integers in the set notation brackets refer to the queries (e.g., Q0 or Q1). The inverted index provides a fast lookup to identify common and dissimilar terms and can also provide a fast lookup of the total number of the common and similar terms. With the inverted index constructed, at least one common term between terms included in the first query and the second query can be identified from the inverted index at 504. If no common terms are identified, then the first query and the second query are not related and the method 500 ends. However, if at least one common term is identified from the inverted index, then the first query is related to the second query at 506.

With the relationship between the first query and the second query established, a number of dissimilar terms (if any) are identified between the terms that comprise the first query and the second query at 510. As discussed above, in an example embodiment, the number of dissimilar terms may be identified from the inverted index. The weight of the relationship may then be calculated based on the identified number of dissimilar terms at 512. In an example embodiment, the weight may be based on a difference between the number of dissimilar terms. For example, the difference may be defined as the subtraction of a number of dissimilar terms included in the first query from the number of dissimilar terms included in the second query. Vice versa, the difference may also be defined as the subtraction of the number of the dissimilar terms included in the second query from the number of the dissimilar terms included in the first query. As will be explained in more detail below, the type of subtraction used to define the difference (or weight) may be dependent on a direction traversed between the two queries, either from the first query to the second query or vice versa.

Figure 6A:
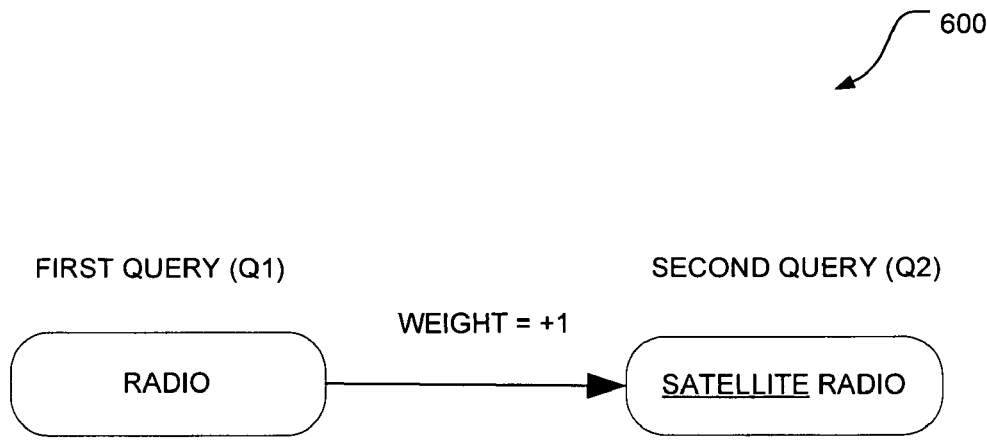
FIGS. 6A and 6B depict a graphical representation of an assignment of weight, in accordance with an example embodiment, to a relationship between a first query and a second query.
Figure 6B:
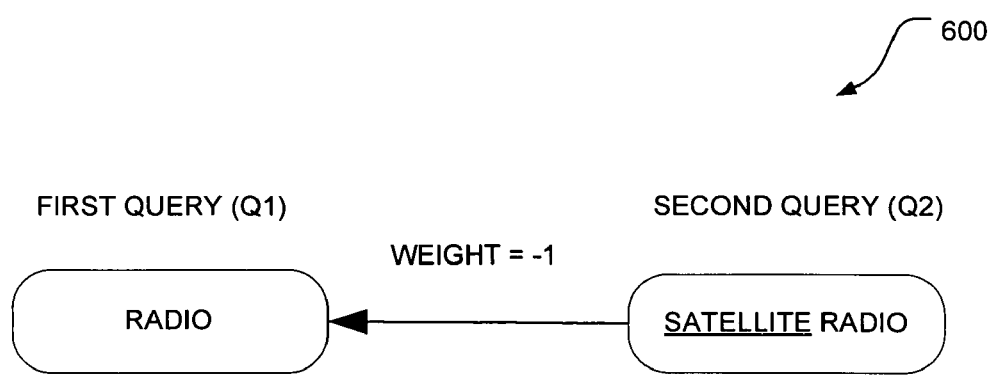

FIGS. 6A and 6B depict a graphical representation of an assignment of weight, in accordance with an example embodiment, to a relationship between a first query Q1 and a second query Q2. As depicted in FIG. 6A, the query network graph 600 shows two nodes, with each node representing a query. The first query Q1 includes the term "radio" while the second query Q2 includes the terms "satellite radio." In this example embodiment, the weight assigned to the relationship between the first query Q1 and the second query Q2 is based on a number of dissimilar terms between the queries Q1 and Q2. For example, a number of dissimilar terms included in the first query Q1 are initially identified. Since the first query Q1 only includes a common term "radio" and no dissimilar terms, the number of dissimilar terms included in the first query Q1 is identified as zero. The second query Q2, on the other hand, includes a common term "radio" as well as a dissimilar term "satellite," which is unique between the first query Q1 and the second query Q3. As a result, the number of dissimilar terms included in the second query Q2 is identified as one.

The weight can be based on a difference between the number of dissimilar terms included in the first query Q1 and the number of dissimilar terms included in the second query Q2. The type of subtraction used to define the difference depends on a direction traversed between the first query and the second query. As used herein, a "direction traversed" refers to a direction traveled to reach a query from another query. As depicted in FIG. 6A, if the direction traversed is from the first query Q1 to the second query Q2, then the weight is the number of dissimilar terms included the second query Q2, which is identified above as +1, subtracted from the number of dissimilar terms included in the first query Q, which is identified above as 0. The subtraction of 1−0 is calculated as +1. That is, one dissimilar term needs to be added to the first query Q1 to equal the number of dissimilar terms included in the second query Q2.

In FIG. 6B, the direction traversed is from the second query Q2 to the first query Q1. In this direction, the weight is the number of dissimilar terms included in the first query Q1, which is identified above as 0, subtracted from the number of dissimilar terms included in the second query Q2, which is identified above as +1. The subtraction of 0−1 is calculated as −1. That is, one dissimilar term needs to be subtracted from the second query Q2 to equal the number of dissimilar terms included in the first query Q1.

In a query network graph, such as the query network graph 600, the weight may be represented by various properties of the lines (e.g., line width and line colors) as well as by the distance between the queries. For example, a thick line may indicate a strong relationship while a thin line may indicate a weak relationship. In another example, a short distance between the first query Q1 and the second query Q2 may indicate a strong relationship while a long distance between the same queries Q1 and Q2 may indicate a weak relationship.

It should be noted that queries formed by adding new terms to the original query are specializations of the original queries, whereas queries formed by dropping words from the original query are generalizations of the original query. Every edge between any two pair of nodes (e.g., the first query Q1 and the second query Q2) may include meta-information indicating whether the first query Q1 is a set of Q2 ($Q_1 \subset Q_2$) or Q2 is a subset of Q1 ($Q_2 \subset Q_1$), which conveys whether the traversal direction would lead to a generalization or a specialization. Furthermore, the edges may be bidirectional where, as discussed above, traversal in one direction results in a generalization whereas traversal in the other direction may result in a specialization.

Figure 7:
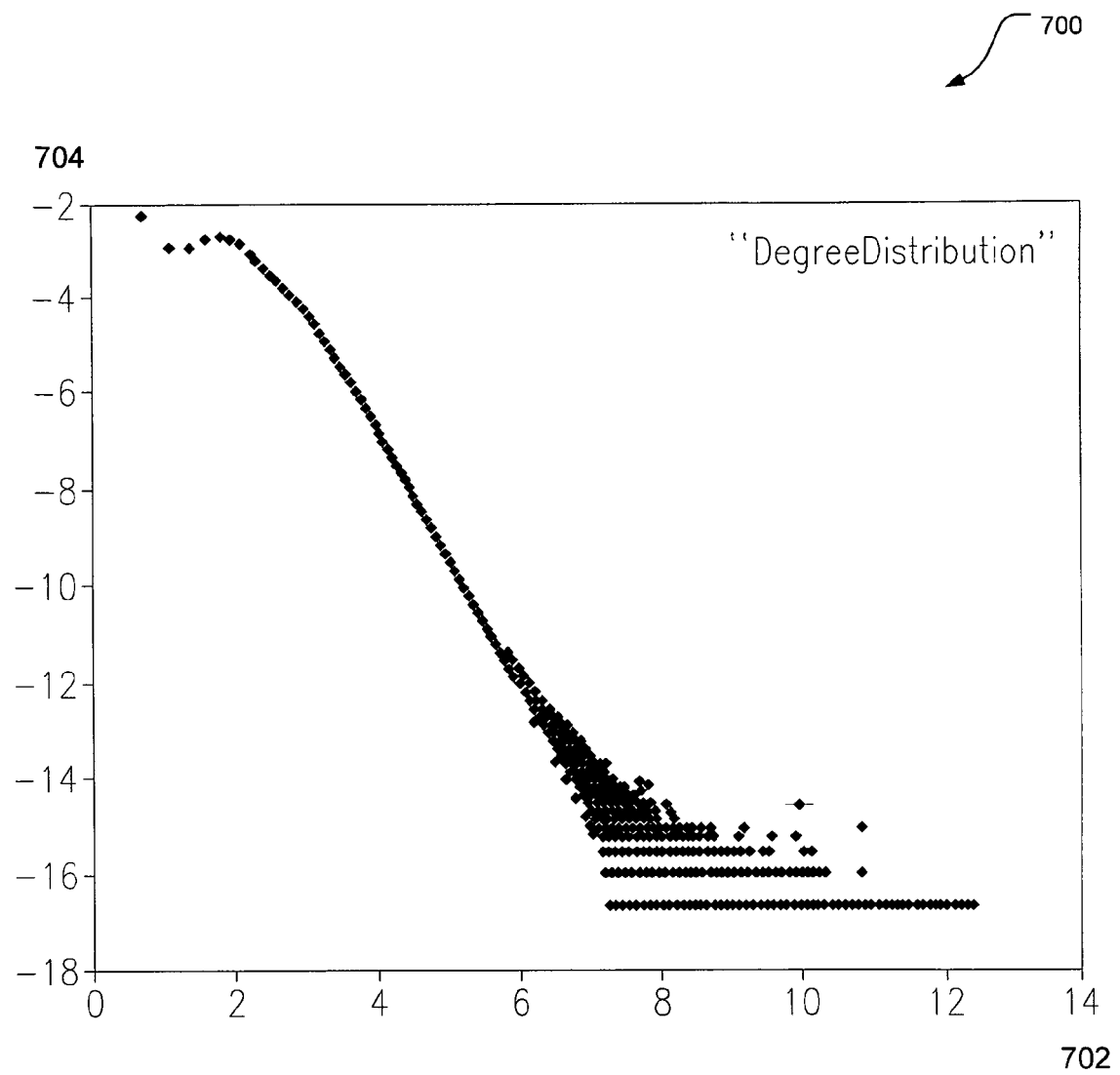
FIG. 7 depicts a plot of a power law distribution, in accordance with an example embodiment, for node degree derived from relationships based on textual similarity.

FIG. 7 depicts a plot 700 of a power law distribution, in accordance with an example embodiment, for node degree derived from relationships based on textual similarity. The horizontal axis 702 defines the node degree of queries while the vertical axis 704 defines a fraction of queries in a query network with that node degree. Both the horizontal axis 702 and the vertical axis 704 are plotted on a log scale. It should be appreciated that the dissimilarity between queries increases as a number of dissimilar terms increase. For example, the dissimilarity between a first query Q1 and a second query Q2 may be expressed as:

$$T_s = \left(\frac{1}{2^D}\right) \text{if } W_{Q_1} \subseteq W_{Q_2} \text{ or if } W_{Q_2} \subseteq W_{Q_1} \quad (1.0)$$

where D is the term distance between the first query Q1 and the second query Q2, which is the difference in numbers between the two queries Q1 and Q2. If $W_{Q_1}$ is not a subset of $W_{Q_2}$ or vice versa, then Ts=0. FIG. 7 is a plot 700 of the distribution based on the application of Equation 1.0. As evident from the plot 700, a number of similarities exponentially decrease as a number of dissimilarities are increased. It should be noted that out of approximately 17 million example queries, there may be about 500,000 queries that do not have connections. These queries that do not have any connections may be rare or unique queries, misspelled queries or some nonsensical robot generated queries.

Figure 8:
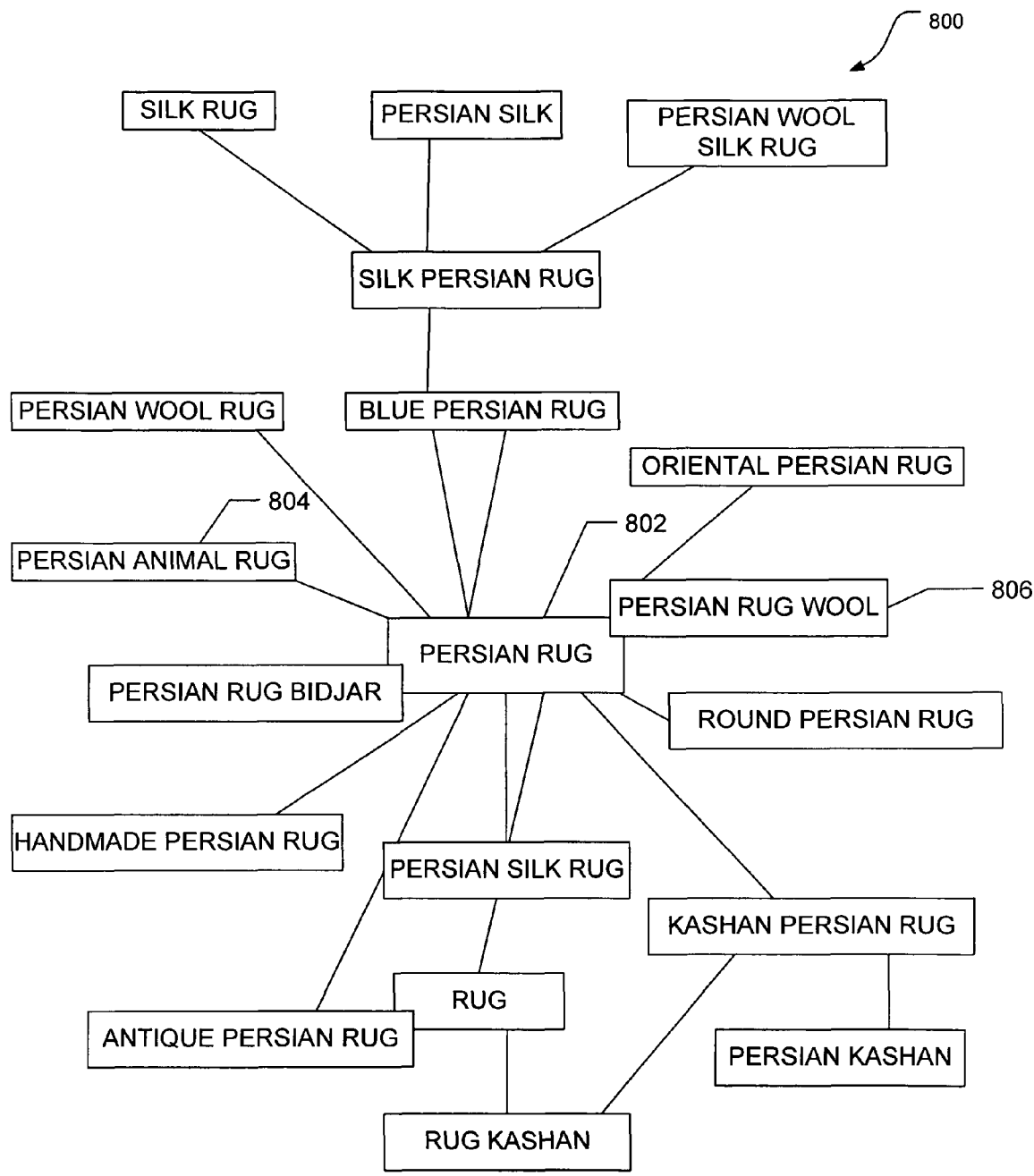
FIG. 8 depicts a graphical representation of a query network graph around a query, in accordance with an example embodiment.

FIG. 8 depicts a graphical representation of a query network graph 800 around a query 802, in accordance with an example embodiment. The query network graph 800 depicts various related queries, in the form of nodes, interconnected by lines that show the relationships between each of the queries. In particular, the query network graph 800 centers around the query "Persian rug" 802. The query network graph 800 is formed by including only queries with assigned weights that exceed 0.5. As is evident from the query network graph 800, the query network graph 800 shows many query specializations and generalizations that may be obtained by inferring relationships based on textual similarity. As a result, the extraction of relationships between the queries contributes to more related query recommendations, such as the query "Persian animal rug" 804 and the query "Persian rug wool" 806, to thereby expand the query 802 and improve search relevance.

Relationships Based on Queries Associated with Single Search Sessions

Figure 9:
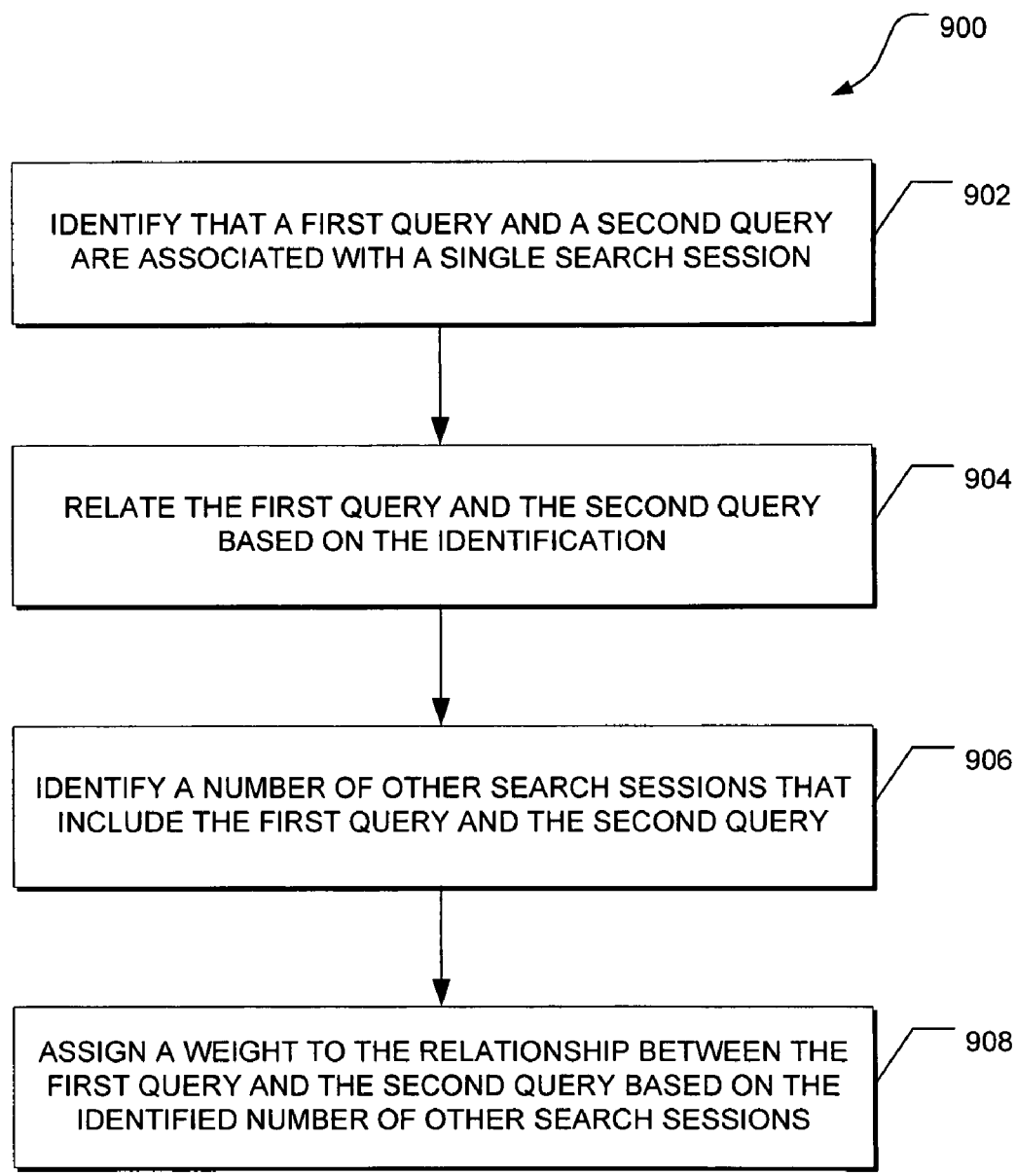
FIG. 9 depicts a flow diagram of a general overview of a method, in accordance with an example embodiment, for inferring relationships between queries inputted within a single search session.

FIG. 9 depicts a flow diagram of a general overview of a method 900, in accordance with an example embodiment, for inferring relationships between queries inputted within a single search session. In an example embodiment, the method 900 may be implemented by the relationship identification module 204 of FIG. 2 and employed in processing system 202. In the example of FIG. 9, two queries are inputted, namely a first query and a second query, by a single user. At 902, the first query and the second query are identified to be associated with a single search session. A "single search session," as used herein, refers to a series of queries inputted or submitted by a single user. The single search session may be defined by a series of consecutive queries inputted within a predefined time period. For example, a series of queries may be included in a single search session if these queries are inputted consecutively within five minutes. In another example, a series of queries may be identified to be associated with a single search session if the time between the inputs of the queries does not exceed, for example, ten seconds. Alternatively, a series of queries may be included in a single set search session based on a purchase of an item resulting from the input of the queries. For example, a user may input a series of queries to locate one or more items. If the user purchases an item, then the series of queries used to locate the item may be identified to be associated with a single search session.

The first query and the second query may then be related at 904 based on the identification that the first query and the second query are associated with a single search session. With the relationship established, a number of other search sessions submitted by other users that also include the first query and the second query are identified at 906. Here, the first query and the second query may be stored in a data structure with other single search session queries submitted by other users. In general, a data structure provides context for the organization of data. Examples of data structures include tables, arrays, linked lists, and databases. In effect, all the queries submitted by users that may be grouped into single search sessions are aggregated and stored in the data structure. In an example, a number of other search sessions that include the first query in the second query may be identified from this data structure. The identification may, for example, be based on a textual similarity match between the queries. In an example embodiment, only the queries where some purchasing activities have occurred are identified. With this criterion, noise and activity by robots may be filtered out. In another example embodiment, the number of queries identified only includes queries from other sessions that have been observed in at least three other single search sessions because, for example, such filtering can provide an improved confidence level for the inferred relationships.

With the number of other search sessions identified, a weight may be assigned to the relationship between the first query and the second query based on this number at 908. In effect, the weight may be based on the popularity of the first query and the second query being used by others in single search sessions. As an example, if the relationship between the first query and the second query is observed in N sessions, then the weight S assigned to the relationship between the first query and the second query may be expressed in the following Table B.

TABLE B $$S_s = 0.9 \text{ if } N > 10000$$
$$= 0.8 \text{ if } 10000 \geq N > 6000$$
$$= 0.7 \text{ if } 6000 \geq N > 1000$$
$$= 0.6 \text{ if } 1000 \geq N > 200$$
$$= 0.5 \text{ if } 200 \geq N > 50$$
$$= 0.4 \text{ if } 50 \geq N > 20$$
$$= 0.3 \text{ if } 20 \geq N > 6$$
$$= 0.2 \text{ if } 6 \geq N > 4$$
$$= 0.1 \text{ if } 4 \geq N \geq 3$$
$$= 0 \text{ otherwise}$$

The weights depicted in Table B are divided into ten different ranges and it should be appreciated that the example function used to derive the weight S is determined heuristically and through qualitative analysis to normalize the weight between 0 and 1.

Figure 10A:
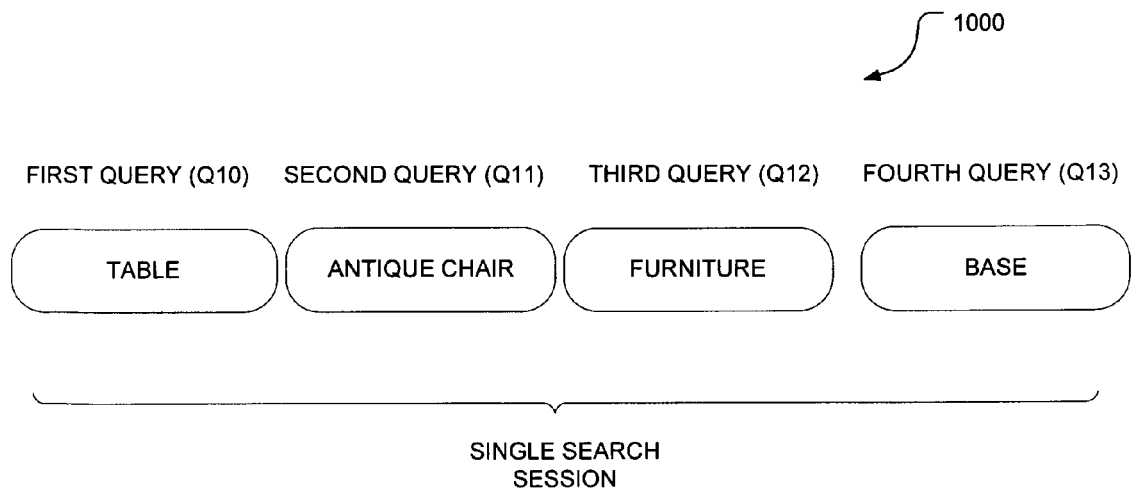
FIGS. 10A and 10B depict a graphical representation of an inference of relationships between queries, in accordance with an example embodiment.
Figure 10B:
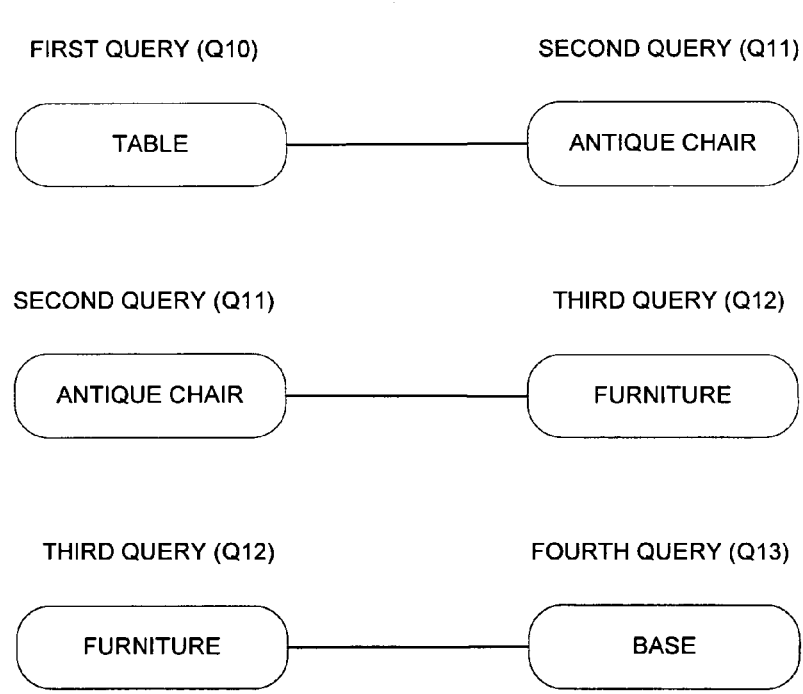

FIGS. 10A and 10B depict a graphical representation of an inference of relationships between queries Q10, Q11, Q12, and Q13, in accordance with an example embodiment. As depicted in FIG. 10A, the query network graph 1000 shows four nodes, with each node representing a query. The first query Q10 includes the term "table," the second query Q11 includes the terms "antique chair," the third query Q12 includes to term "furniture," and the fourth query Q13 includes the term "base." Here, all four queries Q10, Q11, Q12, and Q13 are inputted by a single user within a single search session. For example, the user may have inputted the queries Q10, Q11, Q12, and Q13 consecutively within a predefined time period where the second query Q11 is inputted after the first query Q10, the third query Q12 is inputted after the second query Q11, and the fourth query Q13 is inputted after the third query Q12.

With the four queries Q10, Q11, Q12, and Q13 identified to be associated with a single search session, a variety of relationships may be inferred between the four queries Q10, Q11, Q12, and Q13. In accordance with an example embodiment, relationships may be inferred between every possible combination of two consecutive queries. For example, as depicted in FIG. 10B, the first query Q10 is related to the second query Q11 because the second query Q11 follows the first query Q10. For the same reason, the second query Q11 may be related to the third query Q12, and the third query Q12 may also be related to the fourth query Q13. In another example embodiment, a longer sequence of consecutive queries may be related. For example, relationships may be inferred from every possible combination of three consecutive queries, such that, for example, the first query Q10 may be related to the second query Q11 and the third query Q12, and the second query Q11 may be related to the third query Q12 and the fourth query Q13.

It should be noted that the weights assigned to the relationships between the queries Q10, Q11, Q12, and Q13 may also be based on a direction traversed between the queries Q10, Q11, Q12, and Q13. For example, a probability that the first query Q10 following the second query Q11 may be significantly higher than a probability of the second query Q11 following the first query Q10 because, for example, a user may follow-up on misspelled versions of his query Q10, Q11, Q12 or Q13 with the correct version.

Figure 11:
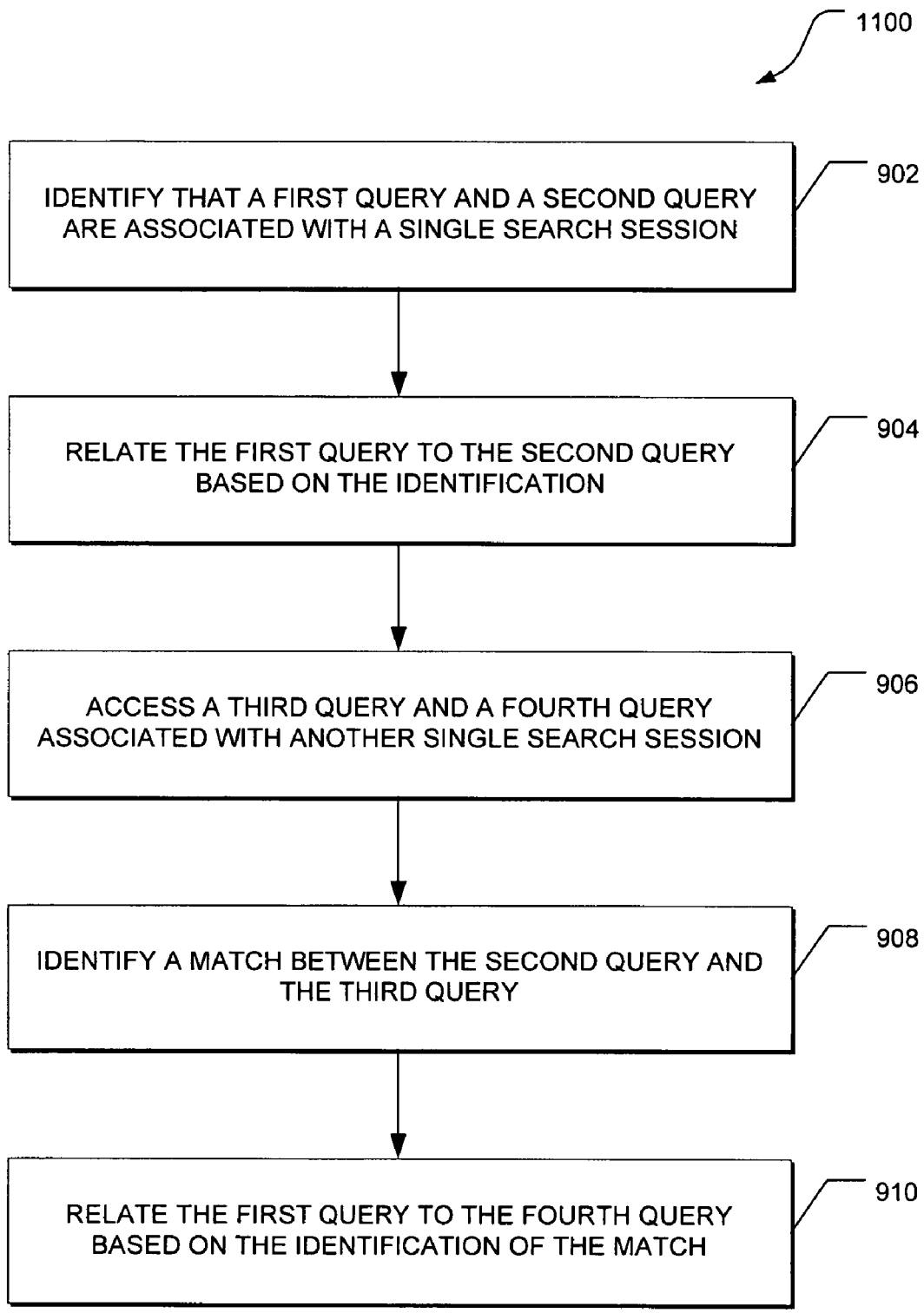
FIG. 11 depicts a flow diagram of a general overview of a method, in accordance with an example embodiment, for inferring relationships between single search session queries submitted by different users.

FIG. 11 depicts a flow diagram of a general overview of a method 1100, in accordance with an example embodiment, for inferring relationships between single search session queries submitted by different users. In an example embodiment, the method 1100 may be implemented by the relationship identification module 204 of FIG. 2 and employed in the processing system 202. In the example of FIG. 11, two queries are submitted, namely a first query and a second query, by a single user. The first query and the second query are identified to be associated with a single search session at 902 and, as a result, the first query is related to the second query at 904.

The relationship identification module may then search for a match of either the first query or the second query with other queries submitted by other users. As an example, a third query and a fourth query inputted by another user may be accessed from, for example, a data structure that stores all the single search session queries from a variety of different users. The third query and the fourth query are related because they are associated with a different single search session. A comparison is then made between the first, second, third, and fourth query to identify a match between at least two queries. If a match is identified at 908, for example, between the second query and the third query, then the first query is related to the fourth query at 910 based on the identification of the match. This relationship between the first query and the fourth query may be made even though these two queries were never included or observed in any single search session from a single user. It should be appreciated that the match may also be based on a textual similarity match, where the terms included in the third query is similar or identical to the terms included in the second query.

Figure 12A:
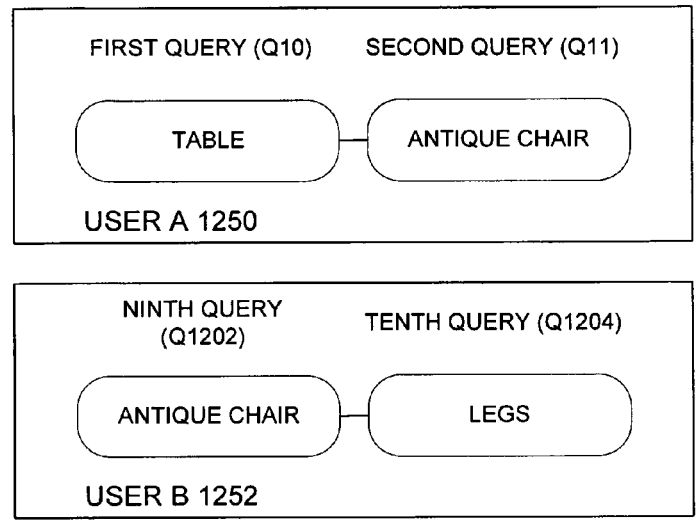
FIGS. 12A, 12B, and 12C depict graphical representations of inferences of relationships, in accordance with an example embodiment, between queries submitted by different users.
Figure 12B:
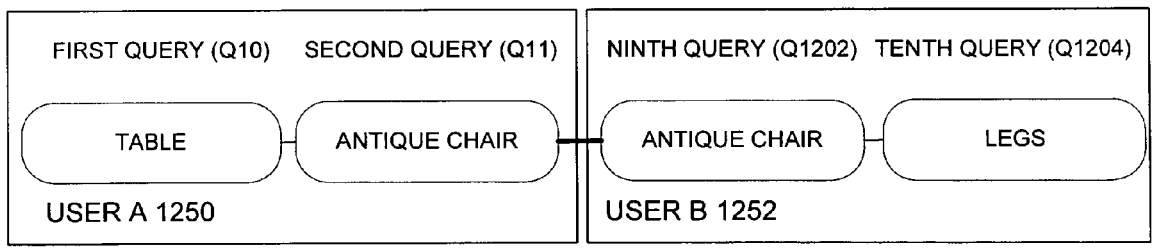
Figure 12C:

FIGS. 12A-12C depict graphical representations of inferences of relationships, in accordance with an example embodiment, between queries Q10, Q11, Q1202, and Q1204 submitted by different users. FIG. 12A depicts four nodes, with each node representing a query. The first query Q10 includes the term "table" and is related to the second query Q11 that includes the terms "antique chair." The first query Q10 and the second query Q11 are associated with a single search session and are inputted by a User A 1250. The ninth query Q1202 includes the terms "antique chair" and is related to the tenth query Q1204 that includes the term "legs." In contrast, the ninth query Q1202 and the tenth query Q1204 are associated with a different single search session and inputted by another User B 1252. It should be appreciated that the queries Q10, Q11, Q1202, and Q1204 and the relationships between the queries may be stored in and accessed from a data structure, which is discussed above.

As depicted in FIG. 12B, a match between the second query Q11 and the ninth query Q1202 is identified because both queries include common terms "antique chair." Since the second query Q11 matches the ninth query Q1202, the first query Q10 may then be related to the tenth query Q1204. As a result, the query network graph 1200 depicted in FIG. 12C shows a connection between the first query Q10 and the tenth query Q1204. A new relationship between the first query Q10 and the tenth query Q1204 may therefore be found based on single search session queries submitted by different users.

Figure 13:
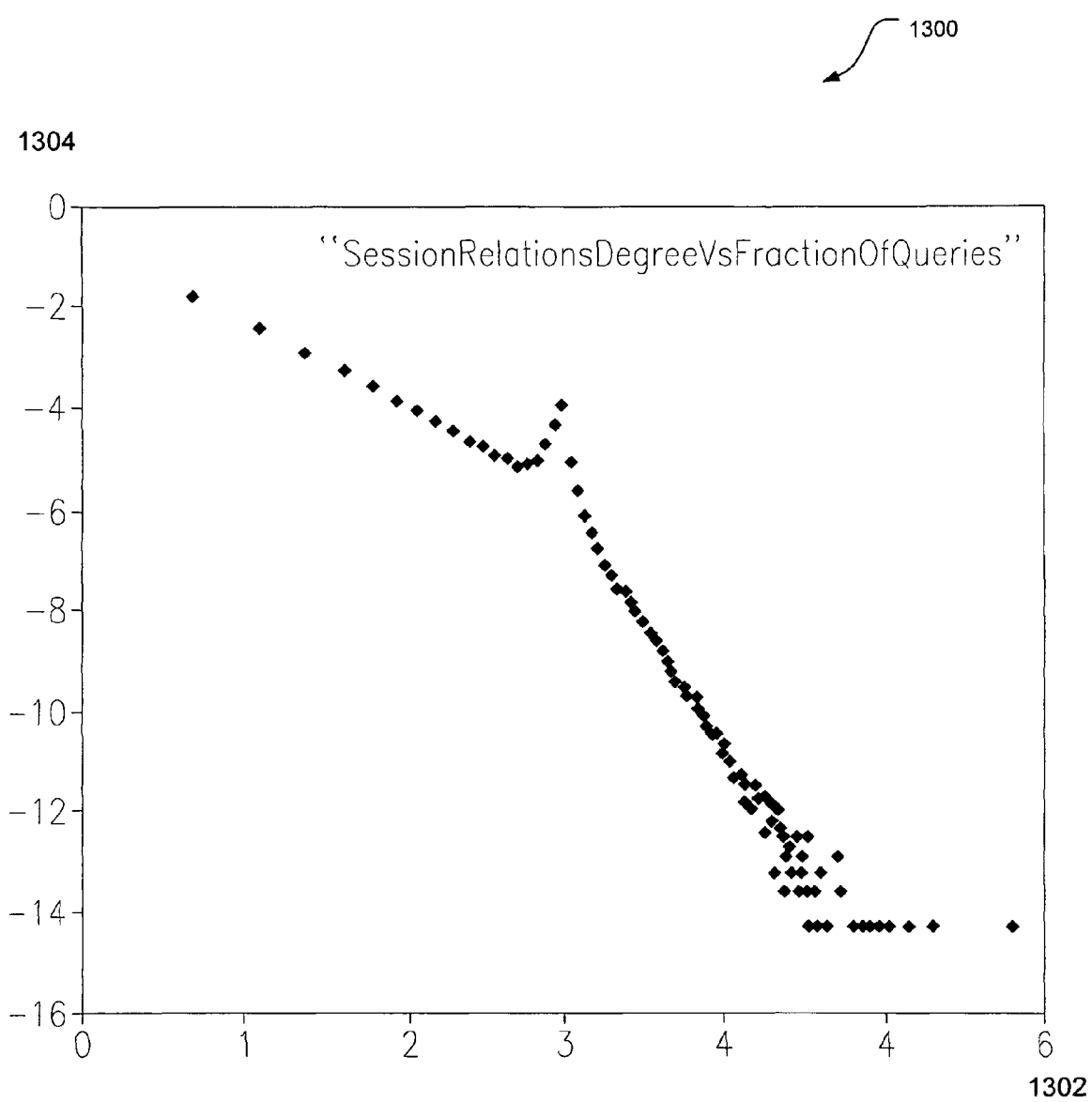
FIG. 13 depicts a plot of a power law distribution, in accordance with an example embodiment, for nodes degree derived from single search session relationships.

FIG. 13 depicts a plot 1300 of a power law distribution, in accordance with an example embodiment, for node degree derived from single search session relationships. The horizontal axis 1302 defines the node degree of queries while the vertical axis 1304 defines a fraction of queries in a query network with that node degree. Both the horizontal axis 1302 and the vertical axis 1304 are plotted on a log scale. When compared to the plot 700 depicted in FIG. 7, plot 1300 is more sparse. As an example, plot 1300 includes about 7,000,000 edges, while the plot 700 depicted in FIG. 7 includes about 168 million edges. Also, out of the 7 million connections or relationships, about 600,000 relations overlap with the relations depicted in the plot 700 of FIG. 7. In reference to FIG.

13, out of a total of approximately 17 million unique queries, about 1.62 million queries may be related based on the single search session technique described above.

Figure 14:
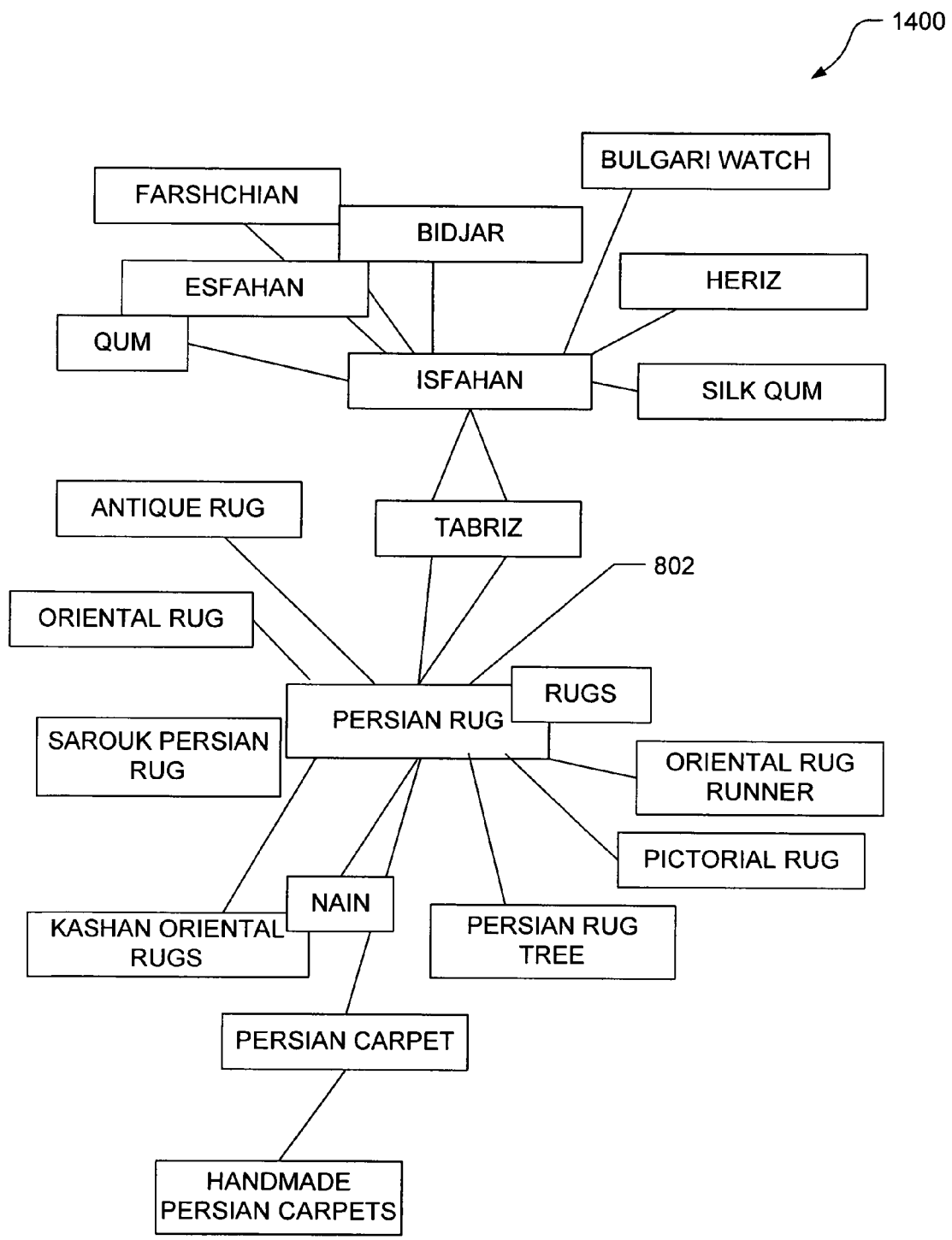
FIG. 14 depicts a graphical representation of a query network graph around a query, in accordance with an example embodiment.

FIG. 14 depicts a graphical representation of a query network graph 1400 around a query 802, in accordance with an example embodiment. This query network graph 1400 centers around the query "Persian rug" 802. When compared to the query network graph 800 depicted in FIG. 8, the query network graph 1400 depicted in FIG. 14 shows that relations derived from single search sessions can capture more semantics than purely syntactic term distance based connections. For example, synonyms in the form of "rugs" and "carpets" are captured. Also, various specific types of rugs like "Isfahan" and "Tabriz" are captured in this network. It should be noted that the weak connection (W=0.2) with "bvlgari watch" may be related to a change of intent in user search sessions or due to other noise in the data, and it should be appreciated that such noise may be eliminated with use of suitable data mining algorithms.

Relationships Based on Retrieved Attributes

Figure 15:
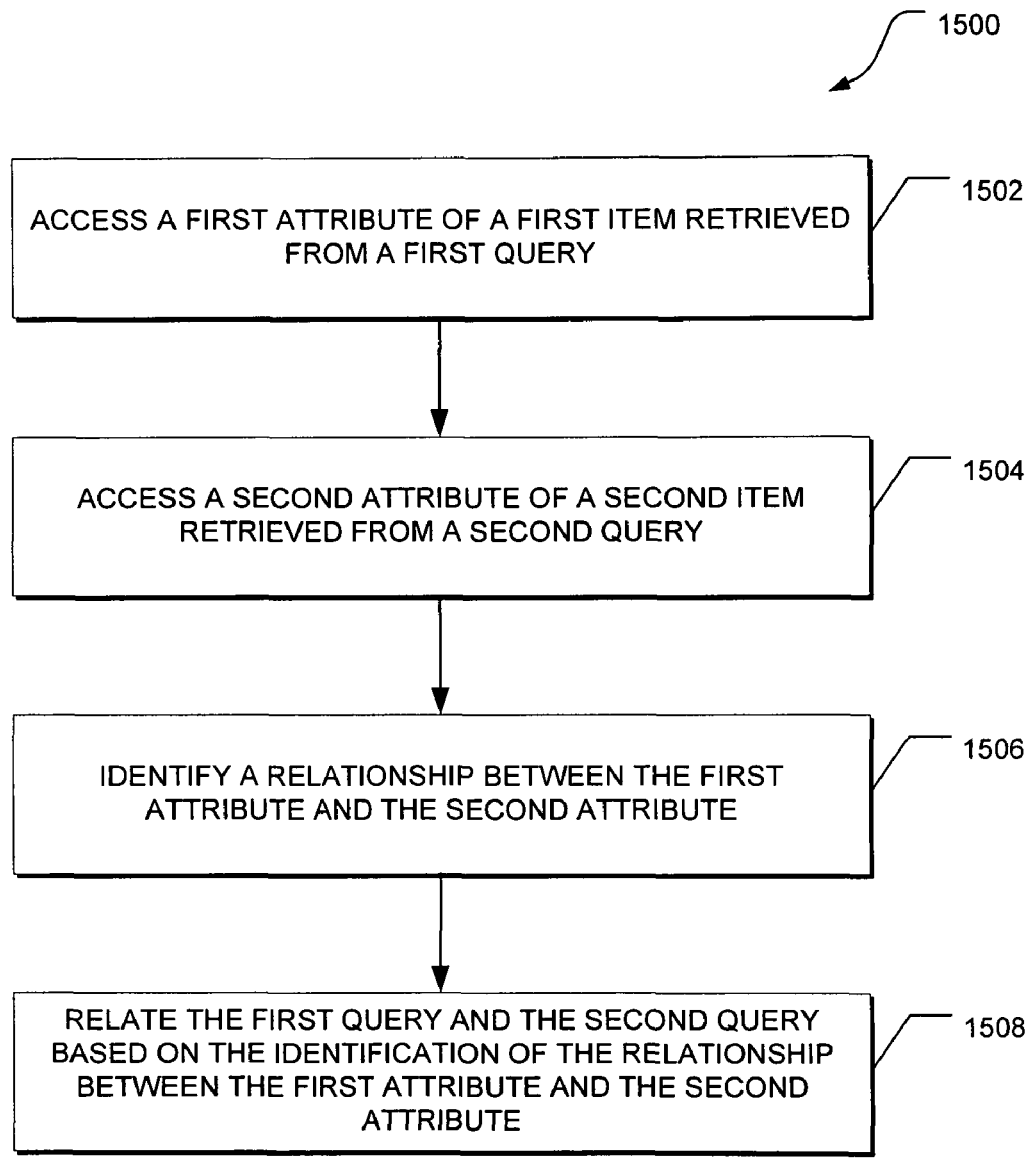
FIG. 15 depicts a flow diagram of a general overview of a method, in accordance with an example embodiment, for inferring relationships between queries based on attributes.

FIG. 15 depicts a flow diagram of a general overview of a method 1500, in accordance with an example embodiment, for inferring relationships between queries based on attributes. In an example embodiment, the method 1500 may be implemented by the relationship identification module 204 of FIG. 2 and employed in the processing system 202. The application of the above-discussed relationship inference techniques may sometimes not find similarities between queries that do not share common terms. As an example, the application of the textual similarity technique to a query comprising the terms "Arlington mayor" and another query comprising the terms "Carmen Gronquist" would not identify a relationship between the queries because they do not share any common terms. However, in actuality, there is a similarity between these two queries because Carmen Gronquist is a former mayor of Arlington. Even if the queries have common terms, the common terms might be used in different contexts. As an example, a query including the terms "airplane model" is very different from another query including the terms "model agency" even though they share a common term "model." To further identify such relationships or non-relationships, the attributes derived from searches using these queries may be examined.

In the example of FIG. 15, two queries are provided, namely a first query and a second query. The first and second queries may be inputted by one or more users to search for one or more items. At 1502, the relationship identification module accesses a first attribute of a first item retrieved from a search using the first query. Similarly, a second attribute of a second item retrieved from a search using the second query is accessed at 1504. An "attribute," as used herein, refers to a property belonging to an item, which may be defined in a title assigned to an item or defined in a description associated with the item. Examples of attributes include size, shape, color, construction material, country of manufacture, brand name, category assigned to the item, serial number, and other attributes.

A relationship between the first attribute and the second attribute is then identified at 1506. In an example embodiment, the relationship may be based on the identification of a common term between the first attribute and the second attribute. The identification of the common term may be based on a textual similarity match. In another example embodiment, the relationship may be based on an identification of the first attribute be semantically related to the second attribute. A semantic relation is a relation between different linguistic units based on, for example, homonymy, synonymy, antonymy, polysemy, paronyms, hypernymy, hyponymy, meronymy, metonymy, holonymy, exocentricity, endocentricity, and linguistic compounds. As an example, the attributes "joyful" and "elated" may be related because they are synonyms. The first query may then be related to the second query at 1508 based on the identification of a relationship between the first attribute and the second attribute.

Figure 16A:
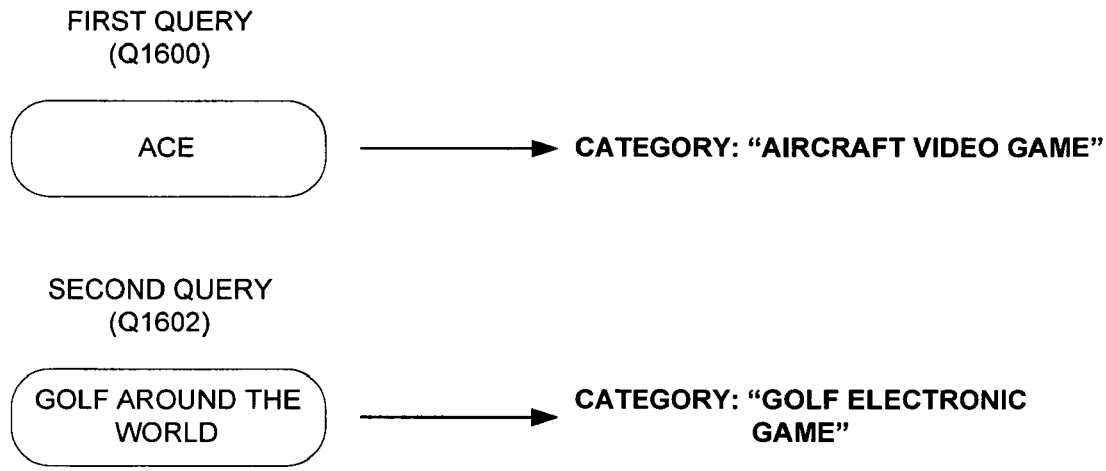
FIGS. 16A and 16B depict graphical representations of an inference of a relationship between queries, in accordance with an example embodiment, based on attributes of items retrieved from the submission of the queries.
Figure 16B:
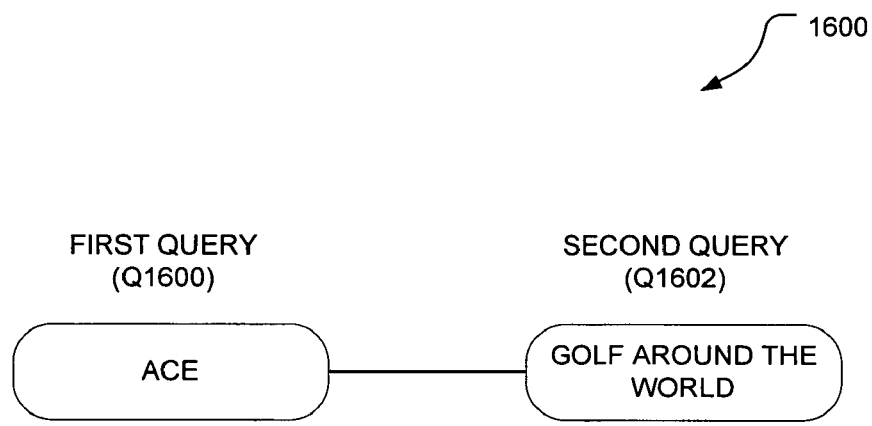

FIGS. 16A and 16B depict graphical representations of an inference of a relationship between queries Q1600 and Q1602, in accordance with an example embodiment, based on attributes of items retrieved from the submission of the queries Q1600 and Q1602. FIG. 16A depicts two nodes, with each node representing a query. The first query Q1600 comprises the term "Ace" while the second query Q1602 comprises the terms "golf around the world." The terms that comprise the first query Q1600 and the second query Q1600 are completely dissimilar. In this example, attributes are extracted from the buying behavior of one or more users as a result of the submission of the first query Q1600 and the second query Q1602. As an example, a user purchases an item in a category called "aircraft video game" resulting from a search by the user using the first query Q1600. Similarly, another user purchases another item in a category called "golf electronic game" resulting from a search by the user using the second query Q1602.

Such category attributes are then accessed and, in this example, the term "video game" and the term "electronic game" are semantically related because they are synonyms. Since at least one semantically related attribute is identified between the first query Q1600 and the second query Q1602, the first query Q1600 is related to the second query Q1602. As a result, the query network graph 1600 depicted in FIG. 16B shows a connection between the first query 1600 and the second query Q1602.

Figure 17:
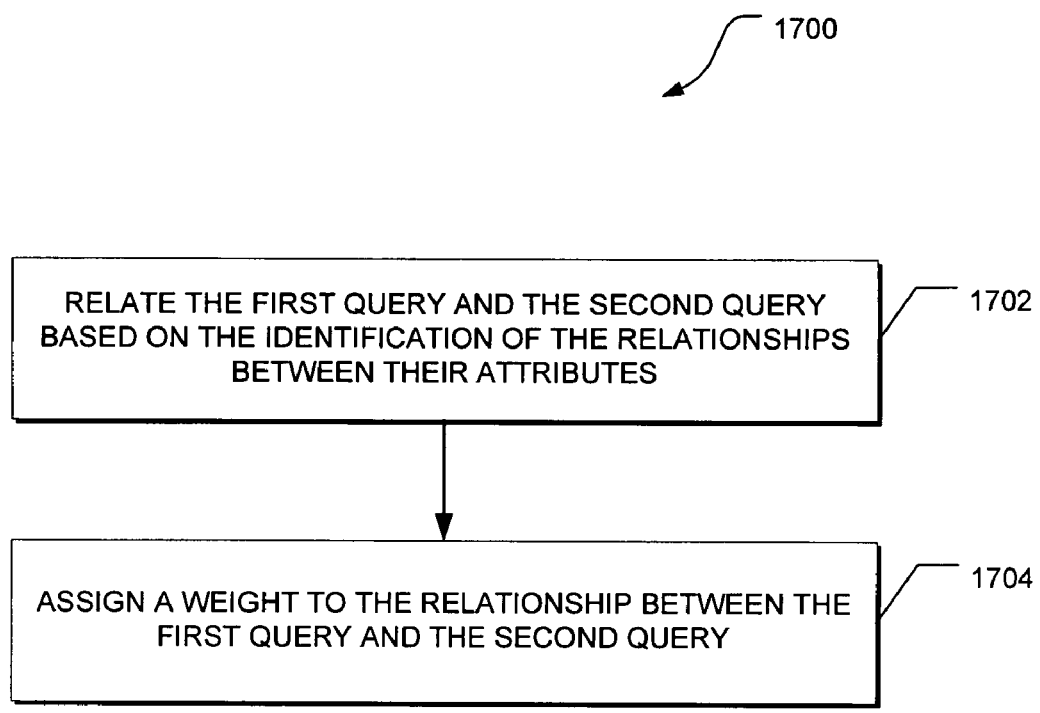
FIG. 17 depicts a flow diagram of a general overview of a method, in accordance with an example embodiment, for assigning weights to the relationship between queries, which are related based on relationships between their attributes.

FIG. 17 depicts a flow diagram of a general overview of a method 1700, in accordance with an example embodiment, for assigning weights to the relationships between queries, which are related based on relationships between their attributes. In an example embodiment, the method 1700 may be implemented by the relationship identification module 204 of FIG. 2 and employed in the processing system 202. In the example of FIG. 17, two queries are provided, namely a first query and a second query. At 1702, the first query and the second query are related based on the identification of at least one relationship between their attributes, which is discussed above. Weights may then be assigned to the relationship between the first query and the second query at 1704.

Whenever an item is purchased as a result of the submission of either the first query or the second query, the attributes associated with the purchased item are extracted or accessed, and weights assigned to the attributes are then incremented by one or more. This can result in a rich data set that maps a query to different attributes with specific weights. As an example, if a user submitted the first query comprising the terms "Britney Spears" and bought an item described as "Britney Spears poster 8×10 new," and another user issued the second query with the same terms and bought an item described as "Britney Spears fantasy perfume new," then the queries "Britney Spears" map to the terms "poster," "8×10," "fantasy," "perfume," and "new" with weights 1,1,1,1, and 2, respectively. It should be noted that that the query may not be mapped to the terms "Britney Spears" present in itself as such terms may be found in all the items bought after issuing the queries. The weights assigned to the terms may further be normalized by the total activity for the query. Once the weights assigned to the terms are normalized, the weights may be converted to a log domain and then scaled linearly into a 32 bit integral range. Table C below shows some other example queries and attributes retrieved as a result of submission of the queries.

TABLE C

| Query | Attributes of Located Items |
|---|---|
| Kobe Bryant | Jersey(7604), LAKERS(6986), auto(5108), signed(4152), mvp(3658), 97(3642), 24(3546), rookie(3442), rc(3310), NBA(2811) |
| Magic Johnson | Jersey(8259), LAKERS (8090), auto(6789), bird(5257), larry(5096), signed(4121), 07(3963), topps(3598) |
| Halle Berry | Photo(8612), 8x10(7898), color(4405), signed(3988), hand(2303), hot(2037), of(1872), coa(1693) |
| Drew Barrymore | Photo(8092), signed(7521), 8x10(6681), magazine(3090) |
| J K Rowling | Potter(5412), harry(5395), 1st(5378), sorcerers(5069), stone(4521), the(4332), signed(3254), and(2833), chamber(2702) |
| Stephen King | 1st(5067), lot(5004), the(4974), of(4849), signed(4012), books(3625), by(2781), edition(2712), hc(2454) |
| Sorcerer's Stone | sorcerers(11177), harry(6573), potter(6573), the(3957), u(3402), american(3402), dj(3303), ed(3220), true(2981) |
| 9780807281956 | Sorcerers(7812), new(5780), book(4776), the(4447), potter(4167), harry(4167), stone(4167) |

As is evident from Table C, although the queries "Halle Berry" and "Drew Barrymore" so not share any common terms, these queries do share some attributes such as "photo," "signed," and "8×10," which indicate some level of relationship between the two queries. In fact, both "Halle Berry" and "Drew Barrymore" are famous actresses and the related attributes describe merchandise associated with the actresses. Table C also shows some common attributes between the query "J K Rowling" and "Stephen King," although both queries do not share common terms, which is expected because both queries refer to popular authors.

Another note from Table C is the similarity in attributes between the query "Sorcerer's Stone" and the query "9780807281956." These queries do not share any common terms and do not seem to be related because the query "Sorcerer's Stone" refers to a noun while the other query "9780807281956" is purely numeric. However the attributes correctly indicate a relationship between the International Standard Book Number (ISBN) of "9780807281956" assigned to the book "Sorcerer's Stone." As a result, the attributes retrieved from the submission of queries can be effective in evaluating the similarity or relationship amongst the queries.

In an example embodiment, weights assigned to the relationships between queries may be based on or derived from the weights associated with the attributes, which is discussed above. As an example, a query (e.g., the first query or the second query) may be represented as a vector in a feature space, with components proportional to the weights associated with the attributes. Here, every query $Q_i$ is represented by a vector $v_i$, which has top n attributes for the query $Q_i$. In an example embodiment, the top twenty five n attributes (or $n \leq 25$ or less than twenty six n<26) are accessed or retrieved. The limitation to the top twenty five attributes can make the weight calculations faster without losing significant accuracy.

The query $Q_i$ may then be represented by the by the $L^2$-norm of the vector $v_i$:

$$Q_i = \frac{v_i}{\|v_i\|_2}$$

The weight $K_s$ assigned to the relationship between queries the first query $Q_1$ and the second query $Q_2$ by be based on a dot product between the attributes:

$$K_s = Q_1 \cdot Q_2 = \frac{v_1}{\|v_1\|_2} \cdot \frac{v_2}{\|v_2\|_2}$$

where the semantic similarity $K_s$ is an inner product with a bounded norm. Since positive components for the vectors are used, $K_s$ lies between 0 and 1. In an example embodiment, weights are limited to values greater than 0.5 ($K_s>0.5$) to further narrow the results to more explainable semantic similarity. Other examples of query pairs and the weights $K_s$ that may be assigned to the relationships between the queries are provided below in Table D.

TABLE D

| Query 1 | Query 2 | Kind of relationship | Weight $K_s$ |
|---|---|---|---|
| Jessica Alba | Sandra bullock | Film celebrities | 0.856 |
| Jessica Alba | Keira Knightley | Film celebrities | 0.812 |
| Jessica Alba | Rosario Dawson | Film celebrities | 0.728 |
| table | black table | Generalization/Specialization | 0.918 |
| Harry Potter | JK Rowling | Book character/Book author | 0.631 |
| MP3 | MPEG Audio Layer-3 | Abbreviation/Full Name | 0.891 |
| Jessica Simpson | shoes | Brand/Item | 0.796 |
| SJP | Sarah Jessica Parker | Initials/Full Name | 0.838 |
| bags | tote | Synonyms | 0.838 |
| videogame system | stereo system | Not much other than both being electronics and containing the word stereo | 0.052 |

Figure 18:
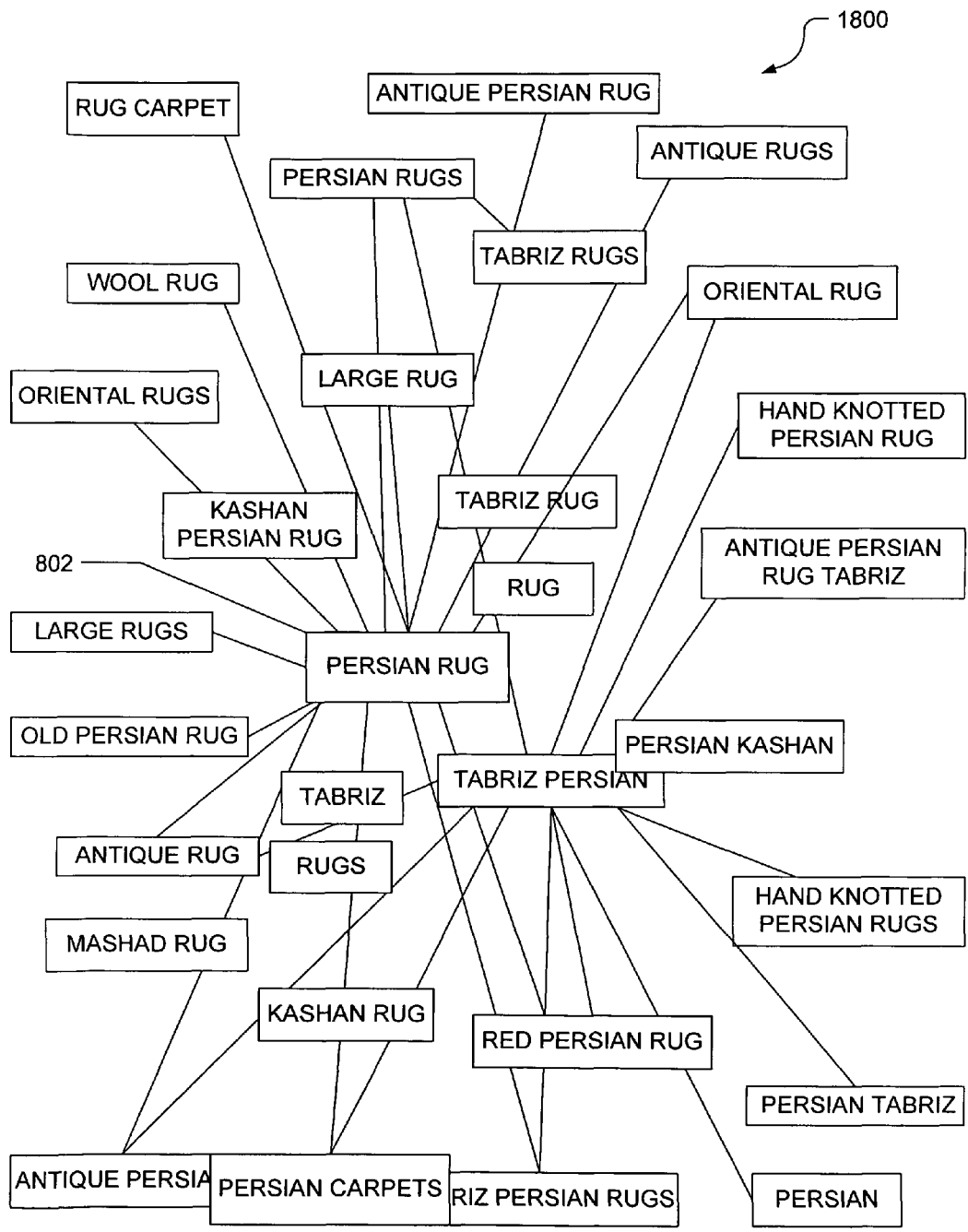
FIG. 18 depicts a graphical representation of a query network graph around a query, in accordance with an example embodiment.

FIG. 18 depicts a graphical representation of a query network graph around a query 802, in accordance with an example embodiment. In the example of FIG. 18, the query network graph 1800 centers around the query "Persian rug" 802. The query network graph 1800 is formed by including relationships between queries with weights that exceed 0.5.

When compared to the query network graph 800 depicted in FIG. 8 and the query network graph 1400 depicted in FIG. 14, the query network graph 1800 depicted in FIG. 18 is denser because relationships based on retrieved attributes may capture more related queries. For example, relationships based on retrieved attributes may capture relationships between queries that are separated by low term distances, as well as between queries do not share any common terms.

Relationships Based on Two or More Above-Referenced Techniques

Figure 19:
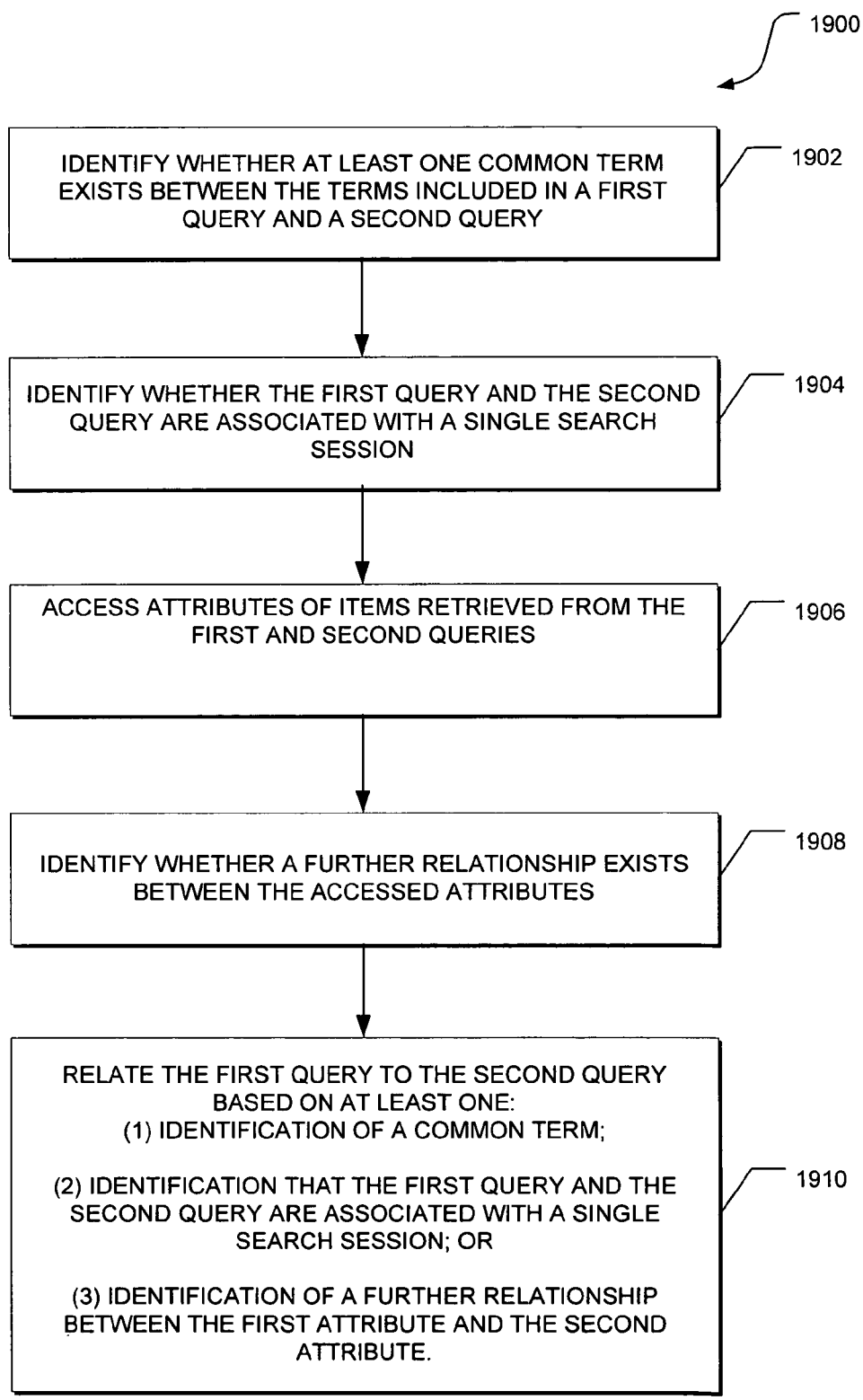
FIG. 19 depicts a flow diagram of a general overview of a method, in accordance with an example embodiment, for inferring relationships between queries related based the techniques discussed above.

FIG. 19 depicts a flow diagram of a general overview of a method 1900, in accordance with an example embodiment, for inferring relationships between queries based on various techniques discussed above. In an example embodiment, the method 1900 may be implemented by the relationship identification module 204 of FIG. 2 and employed in the processing system 202. It should be appreciated that two or more of the above-referenced techniques may be combined to infer relationships between queries and ultimately build the query network graph. As an example, the queries may be related based all three techniques described above. Here, as depicted in the method 1900, two queries are provided, namely a first query and a second query. An identification is made at 1902 as to whether at least one common term exists between the terms included in the first query and the second query. Additionally, an identification may be made at 1904 as to whether the first query and the second query are associated with a single search session. At the same time, attributes of items resulting from the submission of the first query and the second query may be accessed at 1906 and an identification may be made as to whether a further relationship exists between the accessed attributes at 1908.

As depicted at 1910, if a common term is identified to exist between the terms included in the first query and the second query, then the first query may be related to the second query. Further, the first query and the second query may also be related if an identification is made that the first query and the second query are associated with a single search session. Another relationship between the first query and the second query may further be inferred if a relationship is identified to exist between the accessed attributes.

All the three independent techniques may have a scoring function that scores a relationship between two queries with a score between 0 and 1. The three techniques may be combined linearly to define a composite similarity score $$C_s = \alpha T_s + \beta S_s + \gamma K_s$$

where the $\alpha$, $\beta$, and $\gamma$ are coefficients that determine the $T_s$, $S_s$, and $K_s$ weights, which are described above, for the different techniques. By enforcing $\alpha+\beta+\gamma=1$, composite similarity score lies between 0 and 1 for any arbitrary pair of queries. It should be noted that a committee based approach may be used wherein a relationship derived from multiple techniques may be ranked higher than a relationship derived from a single technique. A combination of the two or more techniques can provide a higher level of confidence when compared with the use of a single technique and may also be more effective in filtering out non-relevant data. For example, a user's intent is to purchase a name brand "Optimal" notebook with the submission of the query "Optimal." Although the textual similarities between "Optimal" and "Optimal notebook," and between "Optimal" and "Optimal dishes" are the same, the composite similarity score would be higher for the query pair "Optimal" and "Optimal notebook" as compared to "Optimal" and "Optimal dishes."

Figure 20:
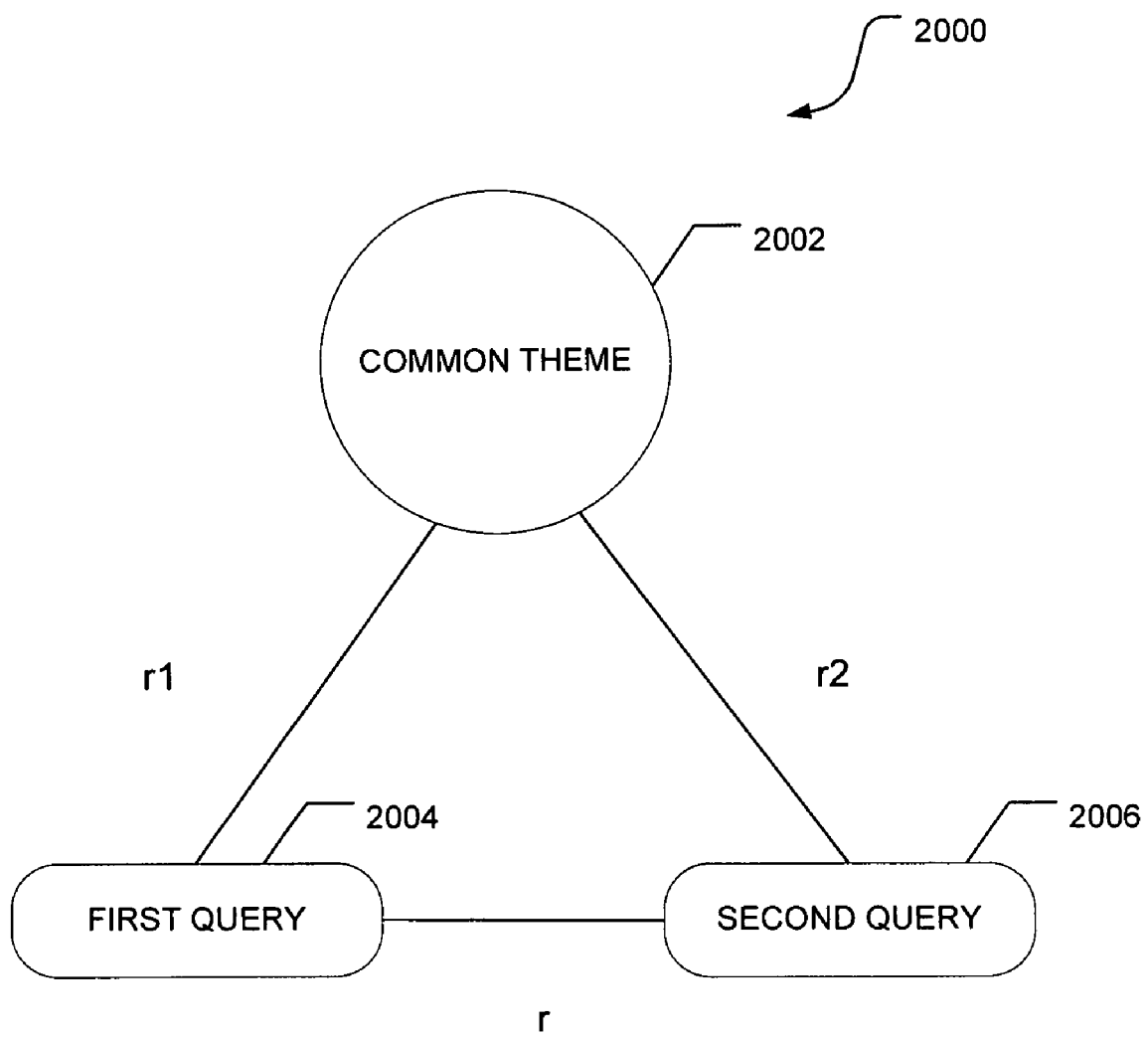
FIG. 20 depicts a graphical representation of a query network graph, in accordance with an example embodiment, depicting a mining of metadata.

FIG. 20 depicts a graphical representation of a query network graph 2000, in accordance with an example embodiment, depicting a mining of metadata. It should be appreciated that, in an example embodiment, metadata may be derived from connections depicted in a query network graph, such as the query network graph 2000. For example, as depicted in FIG. 20, the queries 2004 and 2006 are depicted in the query network graph 2000 where each node of the graph 2000, such as nodes 2004 and 2006, represents a unique query and defined within the nodes are the terms of the query. The connecting lines between the queries 2004 and 2006 represent relationships.

As an example, in reference to the inference of relationships based on a single search session, which is discussed above, the first query 2004 and the second query 2006 that are associated with a single search session may not share any common terms. However, the extensions depicted in the query network graph 2000 may be used to discover a common theme 2002 connecting the first query 2004 and the second query 2006. For example, the common theme 2002 connecting the first query 2004 and the second query 2006 can be used to infer a relationship r between the first query 2004 and the second query 2006, a relationship r1 between the first query 2004 and common theme 2002, and also a relationship r2 between the second query 2006 and the common theme 2002. In some examples, as described below, r1=r2.

These relationships can be classified and used for various purposes. Examples of some different types of relationships include: (1) values of brands (e.g., name brand "Optimal") connected by the common theme 2002 of items (e.g., notebook computer); (2) synonymous item qualifiers (e.g. antique, vintage) connected by the common theme 2002 of items (e.g. jewelry, lamp, and toys); (3) different attributes for an item (e.g. brand name: "Optimal," color: white) connected by the common theme of the item (e.g. notebooks); and (4) brand name and the item (e.g. brand name "Optima" and notebook computer) connected by the common theme 2002 of other attributes related to item (e.g., blue and red). Examples of other common themes 2002 are provided below in Table E.

TABLE E

| Query pairs with no common terms found in a single search session | Connecting themes mined from a query network graph |
|---|---|
| antique ⇔ vintage | Jewelry, lamp, toys |
| gold ⇔ silver | Coin, rings, coins |
| shoes ⇔ boots | Womens, coach, nike |
| cd ⇔ dvd | Player, lot, car player |
| diamond ⇔ gold | Rings, ring, earrings |
| dvd ⇔ mp3 | Player, players, player portable |
| ring ⇔ necklace | Diamond, gold, tiffany |

Figure 21:
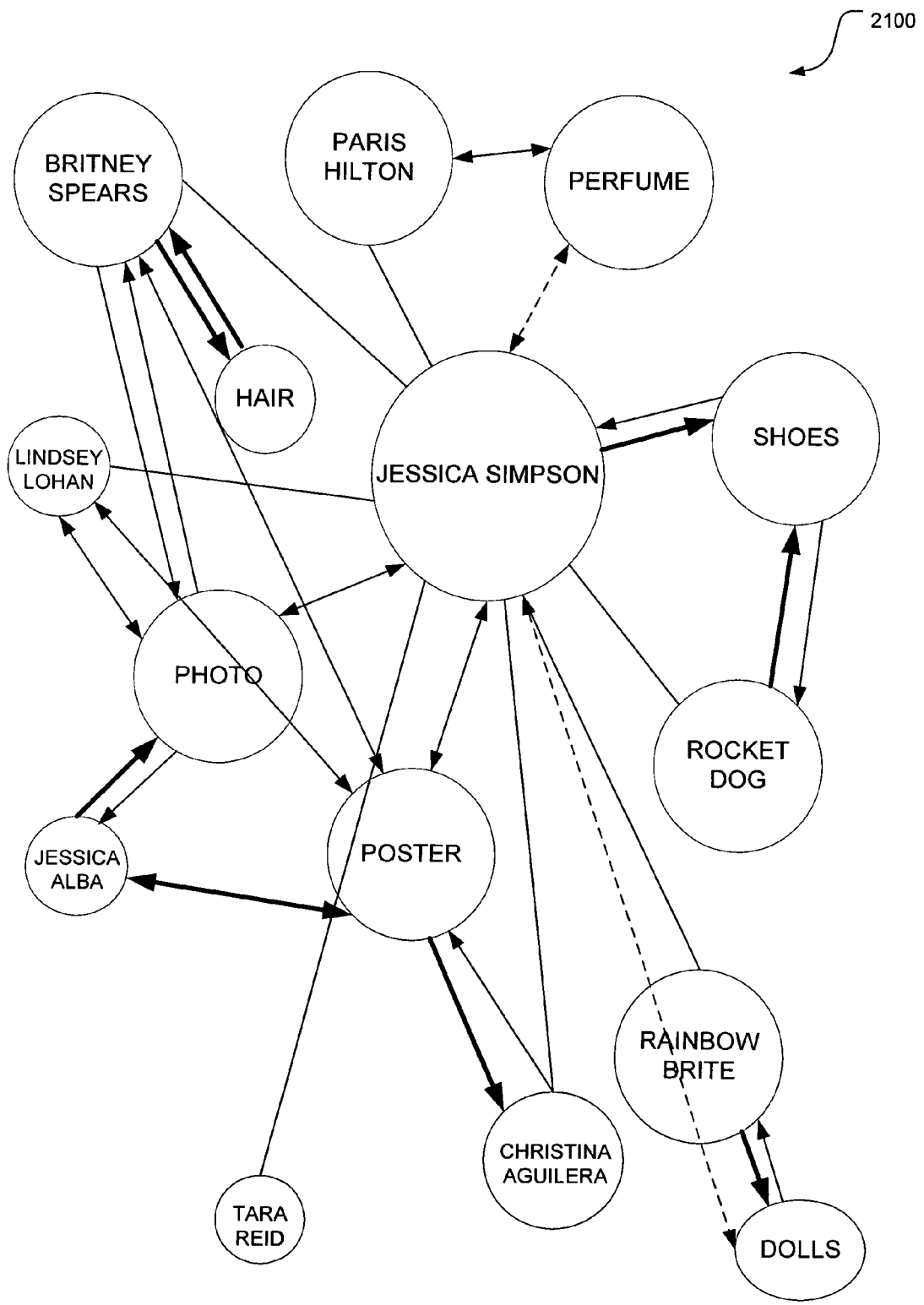
FIG. 21 depicts a graphical representation of a meta-graph, in accordance with an example embodiment, derived from query network graphs.

Each node in the query network graph may also include information about a frequency of the query and an amount of inventory found for that query. Such information may be used to identify a measure for the weights assigned to the node. Such weights can be useful when the query network graph is queried by, for example, software applications, to recover from searches resulting in a low number of results, which is described in more detail below. Another meta-graph can be built based on the node weights, connections, and extracted concepts (e.g., as provided in Table E). Such a meta-graph can convey a variety of information. As an example, FIG. 21 depicts a graphical representation of a meta-graph 2100 derived from query network graphs. As an example, the queries depicted in the meta-graph 2100 may be based on a query network graph derived from single search sessions, the concept of which is discussed above, and the connecting themes may be based on another query network graph derived from term similarity, which is also described above.

As depicted in FIG. 21, the meta-graph 2100 depicts the queries "Jessica Simpson," "Paris Hilton," "Britney Spears," "Lindsey Lohan," "Jessica Alba," "Tara Reid," "Christina Aguilera," which may be connected by the common extensions "photo" and "poster." Such connections may further relate the queries to the concept of an artist. Furthermore, the query "Jessica Simpson" and "Rocket Dog" are related by the common extension "shoes," which in this case is a brand name of a shoe. The differing weights of the edges may also provide information on the extendibility of queries and merchandise, and provide relevant results based on such extensions. For example, the query "Jessica Simpson" has a stronger relationship to "shoes" than "posters," whereas the query "Jessica Alba" has a strong connection to "photo" and "posters." As a result, the "Jessica Simpson" query can be extended to "shoes" and the "Jessica Alba" query can be extended to "photo" or "posters."

It should be noted that item searches can return few results because, for example, of the difference in vocabulary between sellers and buyers or because of over-specialization of queries. The various relationship interference techniques described above may be leveraged in these cases to help users reformulate their query or to recommend queries that are more likely to align with the intent of the users. The following Table F provides examples of user queries that did not match any items and some recommendations from the use of the relationship inference techniques described above.

TABLE F

| Query returning zero results | Recommendations |
| --- | --- |
| webkinz zebra | webkinz, webkinz giraffe, webkinz panda, webkinz snake |
| yellow labrador webkinz | labrador webkinz, webkinz charm, webkinz figurines |
| good Kubota | kubota, kubota tractors, kubota diesel |
| wpt poker chip set | poker chips, poker set, clay poker chips |
| wood shoe cabinet | cabinet, wood cabinet, wood kitchen cabinet |
| i m not a shopping bag | i m not a plastic bag, i am not a plastic bag, shopping bag, reusable shopping bag, grocery bag |

Even with queries that return multiple items, the relationship inference techniques described above may be combined and leveraged to find other related queries. As an example, based on a composite similarity score with $\alpha=0.2$, $\beta=0.3$, $\gamma=0.5$, related query recommendations for some submitted queries are provided in the following Table G.

TABLE G

| Query | Top 10 Related Queries |
| --- | --- |
| laptop | HP laptop, DELL laptop, COMPAQ laptop, TOSHIBA laptop, MAC laptop, notebook computer, SONY laptop, laptop bags, laptop case |
| tom cruise | tom cruise book, silent hill, katie holmes, al pacino, brad pitt, tobey maguire, ben affleck, bill murray, matt damon, shirley temple autograph |
| nora roberts | nora roberts books, nora roberts hardcover, audiobooks nora roberts, nora roberts novels, nora roberts trilogy, debbie macomber, fern michaels, catherine coulter, linda howard, johnny Lindsey |
| poker | poker chips, poker table, pokerstars, poker book, casino, poker cards, poker shirt, full tilt, texas hold em, poker dvd |

Table G depicts related query recommendations for some submitted queries where the related queries that do not include the original query are shown in bold. A user may use the recommendations to further reformulate, refine, specialize, and/or generalize his original query or to discover information about competing or complementary brands and items.

Figure 22:
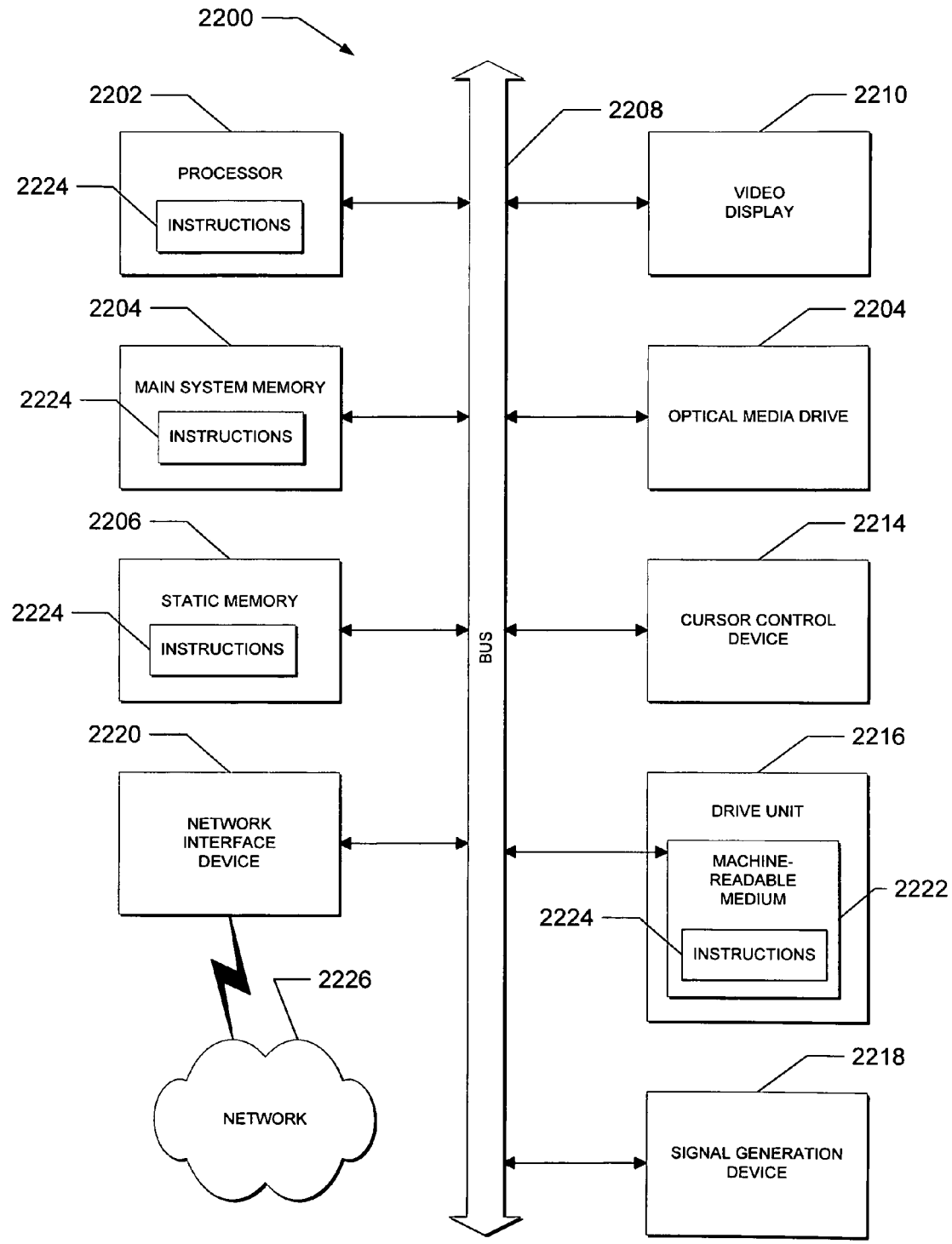
FIG. 22 depicts a simplified block diagram of a machine in the example form of a processing system within which a set of instructions, for causing the machine to perform any one or more of the methodologies discussed herein, may be executed.

FIG. 22 depicts a simplified block diagram of a machine in the example form of a processing system 2200 within which a set of instructions, for causing the machine to perform any one or more of the methodologies discussed herein, may be executed. In alternative embodiments, the machine may be connected (e.g., networked) to other machines. In a networked deployment, the machine may operate in the capacity of a server or a client machine in server-client network environment, or as a peer machine in a peer-to-peer (or distributed) network environment. The machine may include any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example processing system 2200 includes processor 2202 (e.g., a central processing unit (CPU)), main memory 2204 and static memory 2206, which communicate with each other via bus 2208. Processing system 2200 may also include disk drive unit 2216 and network interface device 2220.

Disk drive unit 2216 includes machine-readable medium 2222 on which is stored one or more sets of instructions and data structures (e.g., software 2224) embodying or utilized by any one or more of the methodologies or functions described herein. Software 2224 may also reside, completely or at least partially, within main memory 2204 and/or within processor 2202 during execution thereof by processing system 2200, with main memory 2204 and processor 2202 also constituting machine-readable, tangible media. Software 2224 may further be transmitted or received over network 2226 via network interface device 2220 utilizing any one of a number of well-known transfer protocols (e.g., Hypertext Transfer Protocol (HTTP)).

While machine-readable medium 2222 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques relationship inference may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method of inferring a relationship between a first query comprising a plurality of first terms and a second query comprising a plurality of second terms, the method comprising:

identifying at least one common term between the plurality of first terms and the plurality of second terms;
relating the first query to the second query based on the identifying of the at least one common term;
identifying at least one dissimilar term between the plurality of first terms and the plurality of second terms;
assigning a weight to the relationship between the first query and the second query based on the identifying of the at least one dissimilar term;
identifying a first number of the at least one dissimilar term that is included in the first query; and
identifying a second number of the at least one dissimilar term that is included in the second query,
wherein the weight is based on a difference between the first number and the second number and wherein the difference is based on a direction traversed between the first query and the second query, and wherein the first query and the second query are submitted to locate an item for purchase.

2. The method of claim 1, wherein the identifying of the at least one common term is based on a textual similarity match.

3. The method of claim 1, further comprising identifying a number of the at least one dissimilar term, wherein the weight is based on the number of the at least one dissimilar term.

4. The method of claim 1, further comprising building an inverted index from the first query and the second query.

5. The method of claim 4, wherein the at least one common term and the at least one dissimilar term are identified from the inverted index.

6. A machine-readable medium that stores instructions, which when performed by a machine, cause the machine to perform operations comprising:
comparing a plurality of first terms included in a first query with a plurality of second terms included in a second query;
identifying at least one common term between the first query and the second query based on the operation of comparing the plurality of first terms with the plurality of second terms;
relating the first query to the second query based on the identifying of the at least one common term;
identifying at least one dissimilar term between the first query and the second query based on the operation of comparing the plurality of first terms with the plurality of second terms;
assigning a weight to a relationship between the first query and the second query based on the operation of identifying the at least one dissimilar term,
identifying a first number of the at least one dissimilar term that is included in the first query;
identifying a second number of the at least one dissimilar term that is included in the second query;
subtracting the first number from the second number to define a difference, the weight is based on the difference; and
building an inverted index from the first query and the second query,
wherein the first query and the second query are submitted to locate an item for purchase.

7. The machine-readable medium of claim 6, wherein the operation of identifying the at least one common term is based on a textual similarity match.

8. The machine-readable medium of claim 6, wherein the at least one common term and the at least one dissimilar term are identified from the inverted index.

9. A processing system comprising:
at least one processor; and
a memory in communication with the at least one processor, the memory is configured to store a relationship identification module that is executable by the at least one processor, the relationship identification module having instructions, that when executed by the at least one processor, cause operations to be performed, comprising:
identifying at least one common term between a plurality of first terms included in a first query and a plurality of second terms included in a second query;
relating the first query to the second query based on the operation of identifying the at least one common term;
identifying at least one dissimilar term between the plurality of first terms and the plurality of second terms; and
assigning a weight to a relationship between the first query and the second query based on the operation of identifying the at least one dissimilar term;
identifying a first number of the at least one dissimilar term that is included in the first query;
identifying a second number of the at least one dissimilar term that is included in the second query, the weight is based on a difference between the first number and the second number; and
subtracting the first number from the second number to define the difference, the subtracting is based on a direction traversed from the first query to the second query,
wherein the first query and the second query are submitted to locate an item for purchase.

10. The processing system of claim 9, wherein the operation of identifying the at least one common term is based on a textual similarity match.

11. The processing system of claim 9, wherein the instructions, that when executed by the at least one processor, cause further operations to be performed, comprising identifying a number of the at least one dissimilar term, wherein the weight is based on the number of the at least one dissimilar term.

12. The processing system of claim 9, wherein the instructions, that when executed by the at least one processor, cause further operations to be performed, comprising subtracting the second number from the first number to define the difference, the subtracting is based on a direction traversed from the second query to the first query.

13. A machine-readable medium that stores instructions, which when performed by a machine, cause the machine to perform operations comprising:
identifying that a first query and a second query are inputted consecutively within a first single search session by a first user;
relating the first query to the second query based on the identifying that the first query and the second query are inputted within the first single search session;
accessing a third query and a fourth query that are inputted consecutively within a second single search session by a second user, the third query is related to the fourth query;
identifying a match between the second query and the third query;
relating the first query to the fourth query based on the identifying of the match between the second query and the third query;
identifying a number of a plurality of other search sessions associated with other users that include the first query and the second query, the number indicating popularities of the first query and the second query in the plurality of other search sessions; and assigning a weight to a relationship between the first query and the second query based on the popularities of the first query and the second query in the plurality of other search sessions, wherein the first query and the second query are related based on a purchase of an item within the first single search session.

14. The machine-readable medium of claim 13, wherein the instructions, when performed by the machine, cause the machine to perform operations comprising storing the first query and the second query in a data structure comprised of other plurality of queries provided by other users, wherein the number of the plurality of other search sessions that include the first query and the second query is identified from the data structure.

15. The machine-readable medium of claim 13, wherein the identifying of the match is based on a textual similarity match of the second query with the third query.

16. The machine-readable medium of claim 13, wherein the first single search session is defined by a series of queries inputted within a predefined time period.

17. The machine-readable medium of claim 13, wherein the first query and the second query are related based on the first query and the second query is included in at least one of the plurality of other search sessions.

18. A method of inferring a relationship between queries, the method comprising:

identifying that a first query and a second query are inputted consecutively within a first single search session by a first user;

relating the first query to the second query based on the identifying that the first query and the second query are inputted within the first single search session;

accessing a third query and a fourth query that are inputted consecutively within a second single search session by a second user, the third query is related to the fourth query;

identifying a match between the second query and the third query;

relating the first query to the fourth query based on the identifying of the match between the second query and the third query;

identifying a number of a plurality of other search sessions associated with other users that include the first query and the second query, the number indicating popularities of the first query and the second query in the plurality of other search sessions; and assigning a weight to a relationship between the first query and the second query based on the popularities of the first query and the second query in the plurality of other search sessions, wherein the first query and the second query are related based on a purchase of an item within the first single search session.

19. The method of claim 18, further comprising storing the first query and the second query in a data structure comprised of other plurality of queries provided by other users, wherein the number of the plurality of other search sessions that include the first query and the second query is identified from the data structure.

20. The method of claim 18, wherein the identifying of the match is based on a textual similarity match of the second query with the third query.

21. The method of claim 18, wherein the first single search session is defined by a series of queries inputted within a predefined time period.

22. The method of claim 18, wherein the first query and the second query are related based on the first query and the second query is included in at least one of the plurality of other search sessions.

* * * * *